(12) United States Patent
Yao et al.

(10) Patent No.: US 12,510,280 B2
(45) Date of Patent: Dec. 30, 2025

(54) REFRIGERATOR

(71) Applicant: HISENSE RONSHEN (GUANGDONG) REFRIGERATOR CO., LTD., Guangdong (CN)

(72) Inventors: Huimin Yao, Guangdong (CN); Jinchao Xu, Guangdong (CN); Peng Li, Guangdong (CN); Xiaofen Long, Guangdong (CN); Yuhua Guo, Guangdong (CN); Chunhua Yang, Guangdong (CN); Lipin Wang, Guangdong (CN); Yanwu Fan, Guangdong (CN); Dongning Zhi, Guangdong (CN); Jiawei Zhu, Guangdong (CN)

(73) Assignee: HISENSE RONSHEN (GUANGDONG) REFRIGERATOR CO., LTD., Foshan (CN)

( * ) Notice: Subject to any disclaimer, the term of this patent is extended or adjusted under 35 U.S.C. 154(b) by 240 days.

(21) Appl. No.: 18/348,901

(22) Filed: Jul. 7, 2023

(65) Prior Publication Data
US 2023/0349614 A1 Nov. 2, 2023

Related U.S. Application Data

(63) Continuation of application No. PCT/CN2022/084198, filed on Mar. 30, 2022.

(30) Foreign Application Priority Data

May 28, 2021 (CN) .......................... 202110598608.9
May 28, 2021 (CN) .......................... 202110598609.3
(Continued)

(51) Int. Cl.
*F25C 1/10* (2006.01)

(52) U.S. Cl.
CPC ...................................... *F25C 1/10* (2013.01)

(58) Field of Classification Search
CPC ...... F25C 1/10; F25C 2305/0221; F25C 1/24; F25C 1/04
(Continued)

(56) References Cited

U.S. PATENT DOCUMENTS

| | | | | |
|---|---|---|---|---|
| 3,430,452 A | * | 3/1969 | Dedricks ................... | F25C 1/12 62/347 |
| 4,489,567 A | * | 12/1984 | Kohl ......................... | F25C 1/12 62/347 |

(Continued)

FOREIGN PATENT DOCUMENTS

| | | |
|---|---|---|
| CN | 101886863 A | 11/2010 |
| CN | 102135355 A | 7/2011 |

(Continued)

OTHER PUBLICATIONS

International Search Report and Written Opinion dated Feb. 25, 2022 in corresponding International Application No. PCT/CN2021/121030, translated, 15 pages.

(Continued)

*Primary Examiner* — Eric S Ruppert
*Assistant Examiner* — Kirstin U Oswald
(74) *Attorney, Agent, or Firm* — MH2 TECHNOLOGY LAW GROUP LLP

(57) ABSTRACT

A refrigerator includes a refrigerator body and an icemaker. An ice making chamber is defined in the refrigerator body. The icemaker is provided in the ice making chamber. The icemaker comprises a mold shell and a drive mechanism. The mold shell is provided with a water inlet and comprises a plurality of sub-mold shells. The plurality of sub-mold shells are configured to be switchable between a separated state and a closed state. The plurality of sub-mold shells are (Continued)

away from each other in the separated state, and the plurality of sub-mold shells are close to each other and closed in the closed state. The drive mechanism is configured to drive the plurality of sub-modules to switch between the separated state and the closed state.

18 Claims, 35 Drawing Sheets

(30) Foreign Application Priority Data

| | | |
|---|---|---|
| May 28, 2021 | (CN) | 202110598792.7 |
| May 28, 2021 | (CN) | 202110598794.6 |
| May 28, 2021 | (CN) | 202110599135.4 |
| May 28, 2021 | (CN) | 202110599218.3 |
| May 28, 2021 | (CN) | 202110599421.0 |
| May 28, 2021 | (CN) | 202121188879.9 |
| May 28, 2021 | (CN) | 202121189027.1 |
| May 28, 2021 | (CN) | 202121190182.5 |

(58) Field of Classification Search
USPC .................................................. 62/340
See application file for complete search history.

(56) References Cited

U.S. PATENT DOCUMENTS

| | | | |
|---|---|---|---|
| 9,234,688 B2 | 1/2016 | Son et al. | |
| 9,234,689 B2* | 1/2016 | Son | F25C 1/10 |
| 11,313,603 B2 | 4/2022 | Kim et al. | |
| 11,371,766 B2 | 6/2022 | Kang et al. | |
| 11,874,044 B2 | 1/2024 | Lee et al. | |
| 2004/0093878 A1* | 5/2004 | Sanuki | F25C 1/12 |
| | | | 62/340 |
| 2006/0086135 A1 | 4/2006 | Wu et al. | |
| 2007/0209381 A1* | 9/2007 | Sugaya | F25C 5/06 |
| | | | 62/340 |
| 2007/0283714 A1* | 12/2007 | Yoon | F25C 1/04 |
| | | | 62/340 |
| 2010/0176704 A1* | 7/2010 | Kim | F25D 25/024 |
| | | | 62/340 |
| 2013/0014535 A1 | 1/2013 | Son et al. | |
| 2013/0014536 A1 | 1/2013 | Son et al. | |
| 2013/0081412 A1* | 4/2013 | Son | F25C 5/04 |
| | | | 62/340 |
| 2013/0327074 A1* | 12/2013 | Lee | F25C 1/04 |
| | | | 62/177 |
| 2014/0165618 A1 | 6/2014 | Culley et al. | |
| 2014/0165621 A1 | 6/2014 | Boarman et al. | |
| 2014/0165624 A1 | 6/2014 | Boarman et al. | |
| 2015/0075191 A1* | 3/2015 | Gooden | F25C 5/22 |
| | | | 62/340 |
| 2016/0138844 A1 | 5/2016 | Boarman et al. | |
| 2016/0223242 A1* | 8/2016 | Garcia Gonzalez | F25C 5/04 |
| 2018/0017307 A1 | 1/2018 | Jeong et al. | |
| 2019/0293335 A1* | 9/2019 | Bertolini | F25C 1/04 |
| 2020/0158397 A1 | 5/2020 | Hong et al. | |
| 2020/0158398 A1 | 5/2020 | Kim et al. | |
| 2021/0364211 A1 | 11/2021 | Xue et al. | |
| 2021/0381742 A1 | 12/2021 | Lee et al. | |
| 2023/0221052 A1* | 7/2023 | Lim | F25C 1/22 |
| | | | 62/340 |
| 2023/0258382 A1 | 8/2023 | Yao et al. | |
| 2024/0167748 A1 | 5/2024 | Lee et al. | |

FOREIGN PATENT DOCUMENTS

| | | |
|---|---|---|
| CN | 102353193 A | 2/2012 |
| CN | 102878743 A | 1/2013 |
| CN | 102878744 A | 1/2013 |
| CN | 107144065 A | 9/2017 |
| CN | 108981253 A | 12/2018 |
| CN | 111197890 A | 5/2020 |
| CN | 111197893 A | 5/2020 |
| CN | 213040813 U | 4/2021 |
| CN | 213119630 U | 5/2021 |
| CN | 113237278 A | 8/2021 |
| CN | 113237279 A | 8/2021 |
| CN | 113237281 A | 8/2021 |
| CN | 113237282 A | 8/2021 |
| CN | 113237283 A | 8/2021 |
| CN | 113237284 A | 8/2021 |
| CN | 113237285 A | 8/2021 |
| CN | 215176404 U | 12/2021 |
| CN | 215176405 U | 12/2021 |
| CN | 215176406 U | 12/2021 |
| EP | 3653964 A1 | 5/2020 |
| EP | 3653974 A1 | 5/2020 |
| EP | 3862668 A1 | 8/2021 |
| EP | 3862682 A1 | 8/2021 |
| EP | 3862689 A1 | 8/2021 |
| TW | I724966 B | 4/2021 |
| WO | 2022092593 A1 | 5/2022 |

OTHER PUBLICATIONS

International Search Report and Written Opinion dated Mar. 1, 2022 in corresponding International Application No. PCT/CN2021/130756, translated, 15 pages.
International Search Report and Written Opinion dated Jun. 28, 2022 in corresponding International Application No. PCT/CN2022/084198, translated, 17 pages.
Chinese Notification of the First Office Action dated Apr. 29, 2022 in corresponding Chinese Application No. 202110598608.9, translated, 17 pages.
Chinese First Office Action dated Apr. 29, 2022 in corresponding Chinese Application No. 202110598609.3, translated, 17 pages.
Chinese Second Office Action dated Oct. 19, 2022 in corresponding Chinese Application No. 202110598609.3, translated, 15 pages.
Chinese Decision of Rejection dated Mar. 21, 2023 in corresponding Chinese Application No. 202110598609.3, translated, 13 pages.
Chinese Notification of the First Office Action dated Apr. 28, 2022 in corresponding Chinese Application No. 202110598792.7, translated, 17 pages.
Chinese Notification of the First Office Action dated Oct. 9, 2023 in corresponding Chinese Application No. 202110598794.6, translated, 16 pages.
Chinese Notification of the First Office Action dated Sep. 29, 2023 in corresponding Chinese Application No. 202110599135.4, translated, 11 pages.
Chinese Notification of the First Office Action dated Sep. 29, 2023 in corresponding Chinese Application No. 202110599218.3, translated, 11 pages.
Non-Final Office Action dated Mar. 31, 2025 in corresponding U.S. Appl. No. 18/137,772, 25 pages.
Non-Final Office Action dated Mar. 20, 2025 in corresponding U.S. Appl. No. 18/348,820, 35 pages.
Chinese Notification of the First Office Action dated Oct. 19, 2023 in corresponding Chinese Application No. 202110599421.0, translated, 15 pages.
Final Office Action mailed Sep. 16, 2025 in corresponding U.S. Appl. No. 18/348,820, 27 pages.

* cited by examiner

REFRIGERATOR

CROSS-REFERENCE TO RELATED APPLICATIONS

The present application is a continuation application of International Application PCT/CN2022/084198, filed on Mar. 30, 2022, which claims priorities to Chinese Patent Application No. 202110599421.0, filed on May 28, 2021, Chinese Patent Application No. 202110598609.3, filed on May 28, 2021, Chinese Patent Application No. 202110598792.7, filed on May 28, 2021, Chinese Patent Application No. 202110598794.6, filed on May 28, 2021, Chinese Patent Application No. 202110599218.3, filed on May 28, 2021, Chinese Patent Application No. 202110599135.4, filed on May 28, 2021, Chinese Patent Application No. 202121190182.5, filed on May 28, 2021, Chinese Patent Application No. 202121188879.9, filed on May 28, 2021, Chinese Patent Application No. 202121189027.1, filed on May 28, 2021, and Chinese Patent Application No. 202110598608.9, filed on May 28, 2021, the entire contents of which are incorporated herein by reference in their entirety.

TECHNICAL FIELD

The present disclosure relates to the field of household appliances, and in particular, to a refrigerator.

BACKGROUND

With the increasing demand of consumers for refrigerator function, refrigerators with an ice making function are becoming more and more popular with the consumers.

A main component in the refrigerator to achieve the ice making function is an ice maker, and the ice maker is generally disposed in an ice making compartment separated from a refrigerating compartment or a freezing compartment. A basic principle of ice making includes: injecting water into an ice tray in the ice maker, then supplying cold to the ice making compartment to make the water in the ice tray freeze into an ice cube, and finally demolding the ice cube from the ice tray and dropping the ice cube into an ice storage box for access by a user.

SUMMARY

A refrigerator includes a refrigerator body and an ice maker. The refrigerator body defines an ice making compartment therein. The ice maker is disposed in the ice making compartment, and the ice maker includes a mold shell, a driving mechanism, a first push rod, and a second push rod. The mold shell has a water inlet, and the mold shell includes a first sub-mold shell and a second sub-mold shell. At least one of the first sub-mold shell and the second sub-mold shell is movable, and the first sub-mold shell and the second sub-mold shell are configured to be switchable between a separated state and a closed state. In the separated state, the first sub-mold shell and the second sub-mold shell are away from each other; and in the closed state, the first sub-mold shell and the second sub-mold shell move toward each other to be closed. The driving mechanism is configured to drive the first sub-mold shell and the second sub-mold shell to switch between the separated state and the closed state. The first push rod is located on a side of the first sub-mold shell away from the second sub-mold shell, and the second push rod is located on a side of the second sub-mold shell away from the first sub-mold shell. At least one of the first push rod and the second push rod is fixed; the first push rod is configured to push against the first sub-mold shell when the first sub-mold shell moves to a first predetermined position; and the second push rod is configured to push against the second sub-mold shell when the second sub-mold shell moves to a second predetermined position.

BRIEF DESCRIPTION OF THE DRAWINGS

In order to describe the technical solutions of the embodiments of the present invention more clearly, accompanying drawings to be used in the description of some embodiments will be introduced briefly below. However, the accompanying drawings to be described below are merely some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
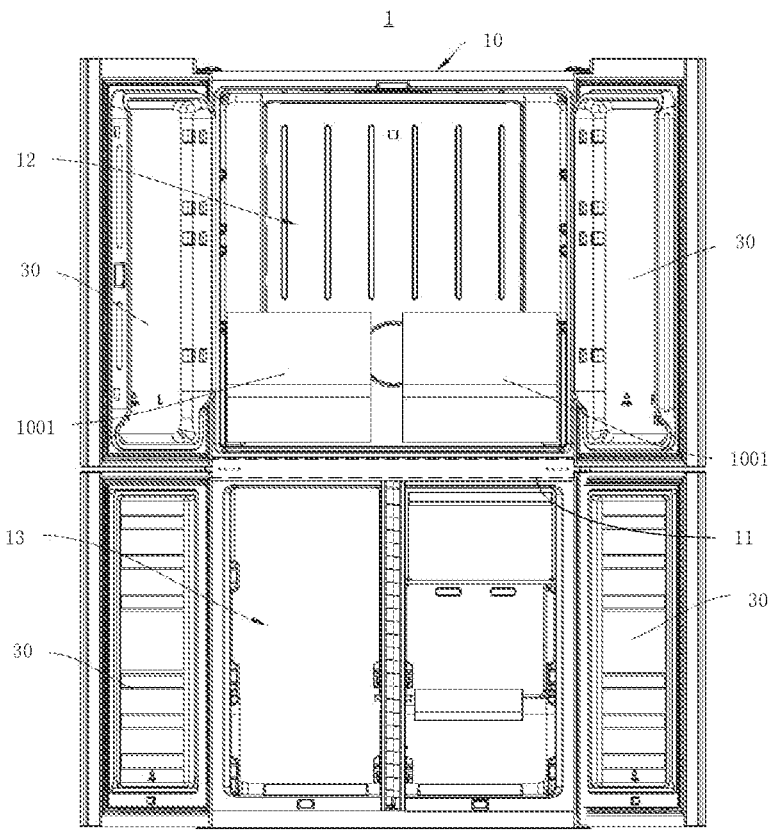
FIG. 1 is a diagram showing a structure of a refrigerator with a door body thereof in an open state, in accordance with some embodiments.

The technical solutions in the embodiments of the present disclosure will be clearly and completely described below with reference to the accompanying drawings. However, the described embodiments are merely some but not all embodiments of the present application. All other embodiments obtained by a person of ordinary skill in the art based on embodiments of the present disclosure shall be included in the protection scope of the present disclosure.

Unless indicated otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics may be included in any one or more embodiments or examples in any suitable manner.

Hereinafter, the terms "first" and "second" are used for descriptive purposes only, and are not to be construed as indicating or implying a relative importance or implicitly indicating a number of indicated technical features. Therefore, the features defined with the terms "first" and "second" may explicitly or implicitly include one or more of these features. In the description of the embodiments of the present disclosure, the terms "a plurality of" and "the plurality of" each mean two or more unless otherwise specified.

In the description of some embodiments, the terms "coupled" and "connected" and their derivatives may be used. For example, the term "connected" may be used when describing some embodiments to indicate that two or more components are in direct physical or electrical contact with each other. For another example, the term "coupled" may be used in the description of some embodiments to indicate that two or more components are in direct physical or electrical contact with each other. The term "coupled" or "communicatively coupled," however, may also mean that two or more components are not in direct contact with each other, but still cooperate or interact with each other. The embodiments disclosed herein are not necessarily limited to the content herein.

The phrase "at least one of A, B, and C" has the same meaning as the phrase "at least one of A, B, or C", and they both include the following combinations of A, B, and C: only A, only B, only C, a combination of A and B, a combination of A and C, a combination of B and C, and a combination of A, B, and C.

The phrase "A and/or B" includes following three combinations: only A, only B, and a combination of A and B.

The term "applicable to" or "configured to" as used herein indicates an open and inclusive expression, which does not exclude devices that are applicable to or configured to perform additional tasks or steps.

The terms such as "about," "substantially," or "approximately" as used herein include a stated value and an average value within an acceptable range of deviation of a particular value determined by a person of ordinary skill in the art, considering measurement in question and errors associated with measurement of a particular quantity (i.e., limitations of a measurement system).

The terms "parallel," "perpendicular," and "equal" as used herein include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, where an acceptable range of deviation of the approximate equality may be, for example, a difference between two equals of less than or equal to 5% of either of the two equals.

A side of a refrigerator 1 facing a user during use is defined as a front side, and a side opposite to the front side is defined as a rear side.

Figure 2:
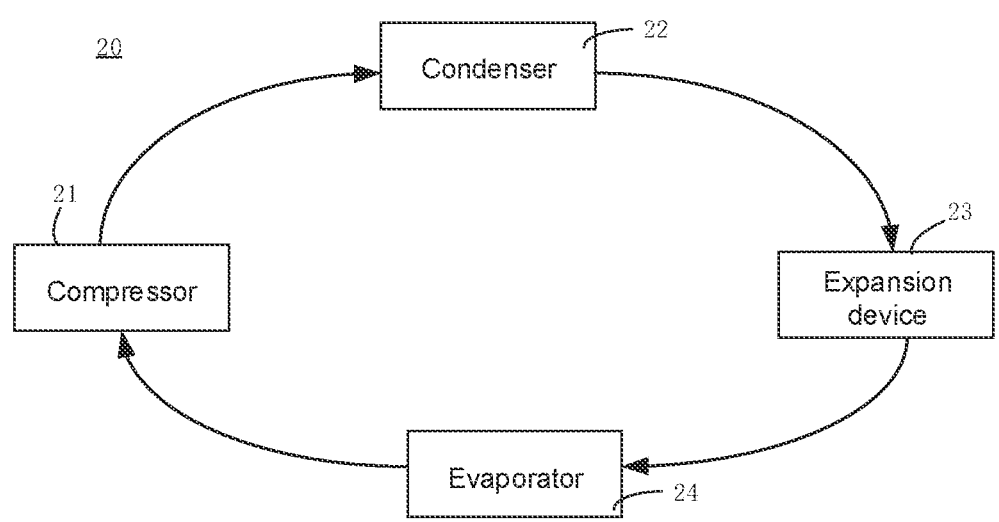
FIG. 2 is a schematic diagram of a cold air supply device of a refrigerator, in accordance with some embodiments.

In some embodiments, referring to FIGS. 1 and 2, the refrigerator 1 includes a refrigerator body 10, a cold air supply device 20, and a door body 30. The refrigerator body 10 includes a storage compartment, the cold air supply device 20 is configured to cool the storage compartment, and the door body 30 is configured to open and close the storage compartment.

The cold air supply device 20 cools the storage compartment by exchanging heat with the outside of the refrigerator body 10. As shown in FIG. 2, the cold air supply device 20 includes a compressor 21, a condenser 22, an expansion device 23, and an evaporator 24, and refrigerant circulates in a sequence of the compressor 21, the condenser 22, the expansion device 23, the evaporator 24, and the compressor 21 to cool the storage compartment.

For example, the evaporator 24 may be disposed in contact with an outer wall of the storage compartment, so as to directly cool the storage compartment. In some embodiments, the cold air supply device 20 may further include a circulation fan, so as to circulate air in the storage compartment through the evaporator 24 and the circulation fan.

The refrigerator body 10 includes a horizontal partition plate 11 disposed at a middle position of the refrigerator body 10 in a height direction, the height direction may be referred to the up-down direction in FIG. 1, and the horizontal partition plate 11 extends in the left-right direction in FIG. 1. A substantial position of the horizontal partition plate 11 is shown with reference to the dotted frame in FIG. 1. The storage compartment is partitioned into an upper storage compartment 12 and a lower storage compartment 13 by the horizontal partition plate 11. In some embodiments, the upper storage compartment 12 is served as a freezing compartment for storing foods in a freezing mode, and the lower storage compartment 13 is served as a refrigerating compartment for storing foods in a refrigerating mode.

In addition, the refrigerator 1 may further include an ice maker 1001, so that the refrigerator 1 has an ice making function. Ice cubes or ice water may be provided to the user through the ice maker 1001. In some embodiments, the ice maker 1001 is directly disposed in the freezing compartment. In this case, the freezing compartment is the ice making compartment. FIG. 1 shows an example in which the ice maker 1001 is disposed in the upper storage compartment 12 (i.e., the freezing compartment). Alternatively, an independent ice making compartment is defined by a heat insulating plate in the refrigerating compartment or the freezing compartment, and the ice maker 1001 is disposed in the ice making compartment.

The door body 30 is pivotally connected with the refrigerator body 10, so as to open or close the storage compartment. For example, the door body 30 may be hinged to a front end of the refrigerator body 10. Four door bodies 30 are shown in FIG. 1.

Figure 3:
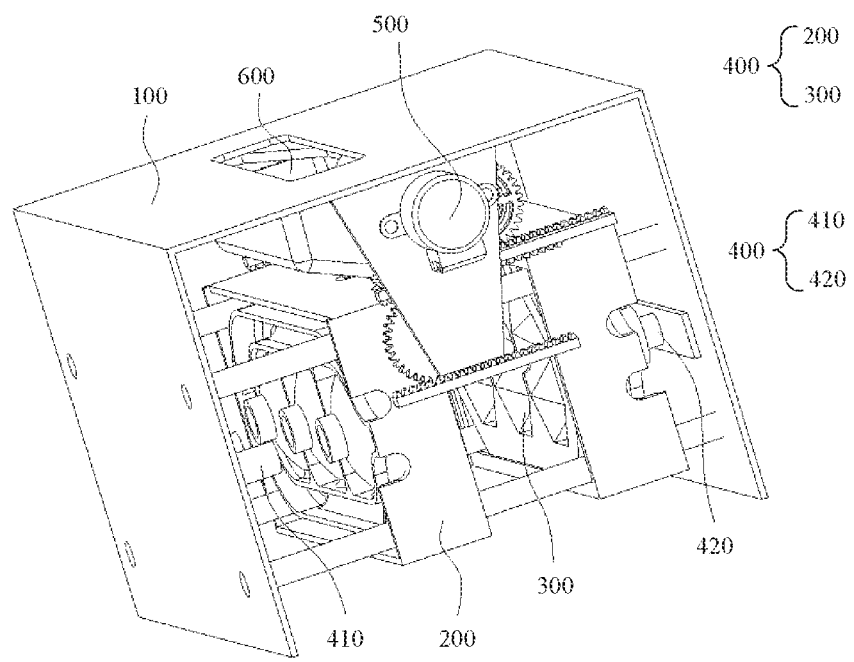
FIG. 3 is a diagram showing a structure of an ice maker, in accordance with some embodiments.

Referring to FIG. 3, the ice maker 1001 includes a base 100, a mold shell 400 (including a shell body 200 and a mold body 300), and a driving mechanism 500.

Figure 4:
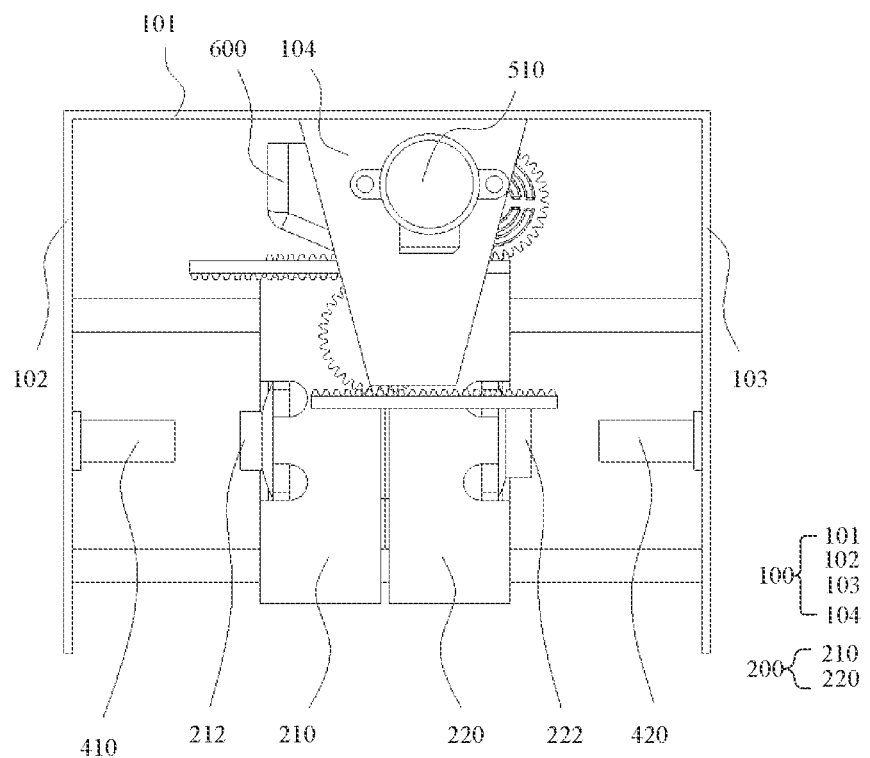
FIG. 4 is diagram showing a structure of an ice maker in a closed state, in accordance with some embodiments.

The base 100 is configured to be connected with the ice making compartment. As shown in FIG. 4, the base 100 includes a plurality of side plates. For example, the plurality of side plates include an upper side plate 101, a left side plate 102, a right side plate 103, a front side plate 104, and a rear side plate. The left side plate 102 is opposite to the right side plate 103 in the left-right direction, the front side plate 104 is opposite to the rear side plate in the front-rear direction, and the upper side plate 101 is located at an upper portion of the left side plate 102, the right side plate 103, the front side plate 104, and the rear side plate. The directions "upper," "front," "rear," "left," and "right" as described in some embodiments of the present disclosure are defined for a clear description of a structure, in an actual arrangement, the base 100 is not limited to be disposed in the ice making compartment in the front-rear direction as shown in FIG. 3.

Figure 6:
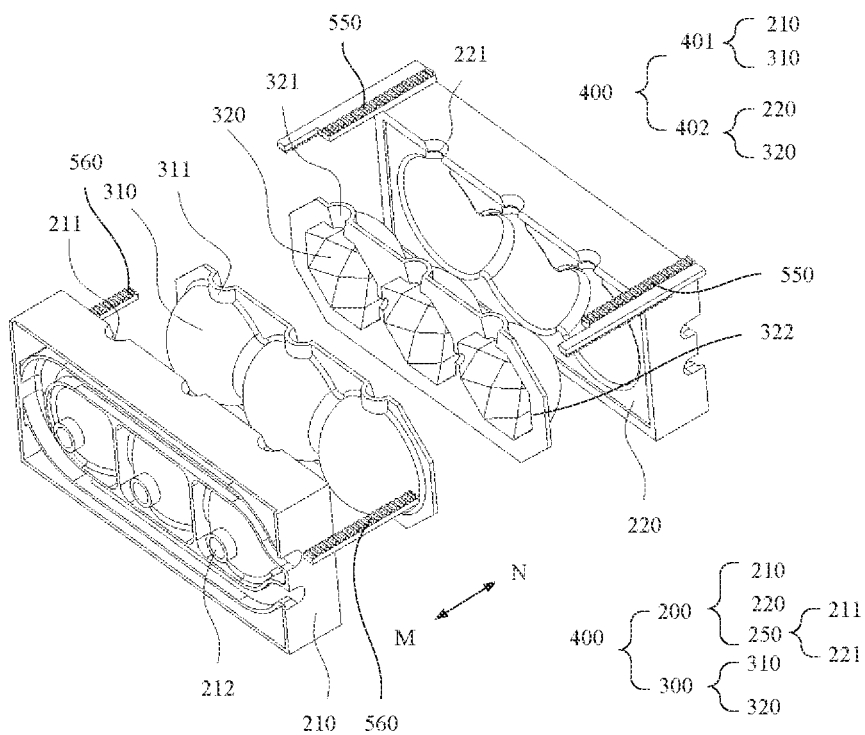
FIG. 6 is an exploded view of a shell body and a mold body of an ice maker, in accordance with some embodiments.

In some embodiments, as shown in FIGS. 3, 4, and 6, the mold shell 400 includes a first sub-mold shell 401 and a second sub-mold shell 402 that may switch between a separated state and a closed state. In the closed state, the first sub-mold shell 401 and the second sub-mold shell 402 are closed to form a mold cavity, which is a cavity enclosed by the first sub-mold shell 401 and the second sub-mold shell 402. A shape of the mold cavity depends on shapes of inner contours of the first sub-mold shell 401 and the second sub-mold shell 402. The shape of the mold cavity is the shape of an ice cube, and the shape of the mold cavity may be adaptively designed according to the requirements of the user. For example, the mold cavity may be designed to be of a sphere, a diamond-faced sphere, or a polyhedron.

In some embodiments, the first sub-mold shell 401 and the second sub-mold shell 402 are both movable, so that the first sub-mold shell 401 and the second sub-mold shell 402 may switch between the separated state and the closed state. In the separated state, the first sub-mold shell 401 and the second sub-mold shell 402 move away from each other; and in the closed state, the first sub-mold shell 401 and the second sub-mold shell 402 move toward each other until they are closed.

Figure 5:
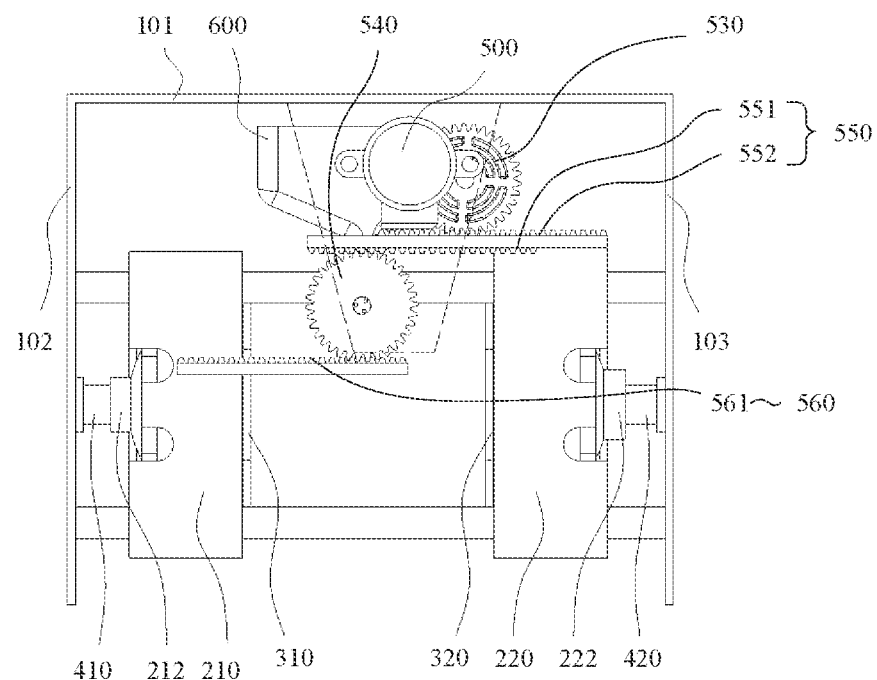
FIG. 5 is diagram showing a structure of an ice maker in a separated state, in accordance with some embodiments.
Figure 8:
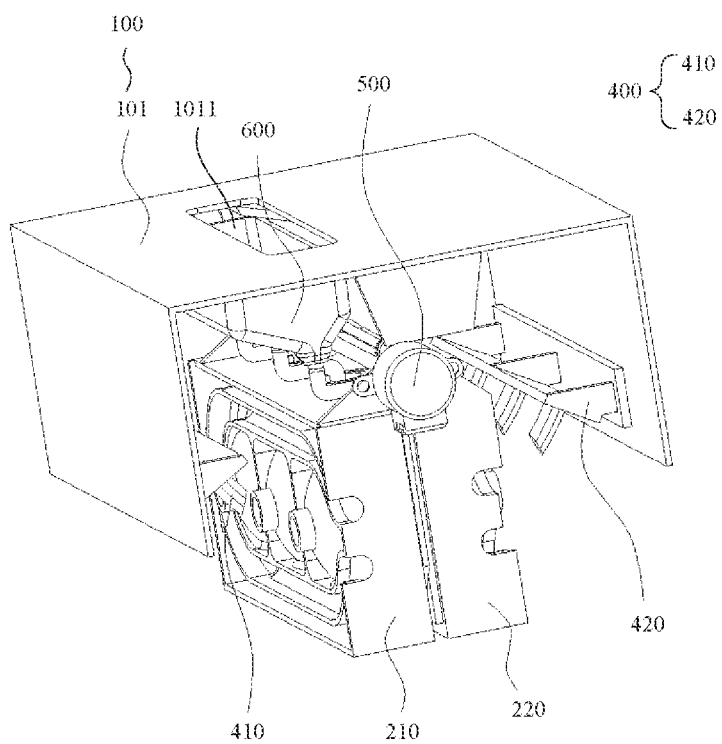
FIG. 8 is a diagram showing a structure of another ice maker, in accordance with some embodiments.
Figure 9:
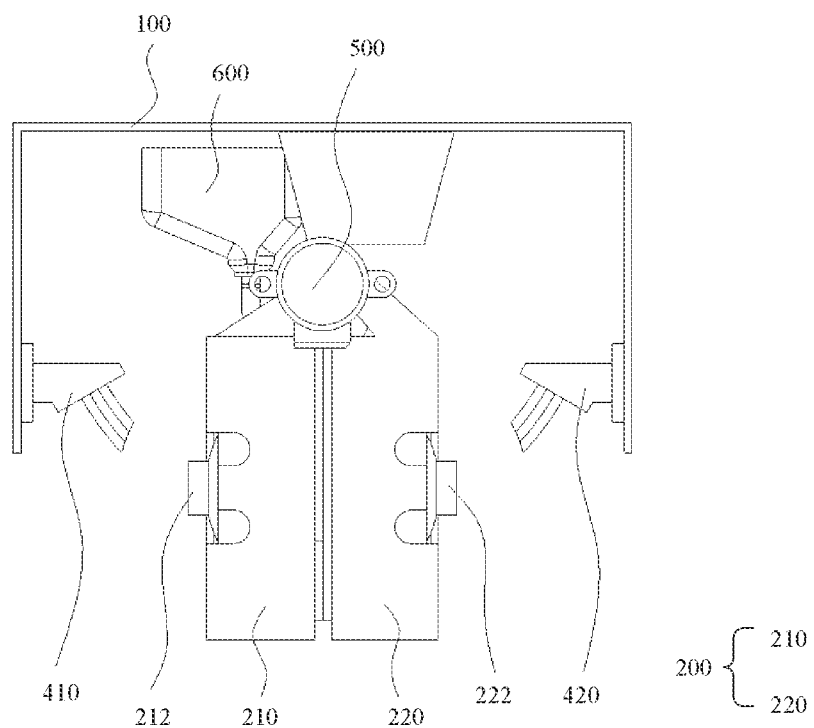
FIG. 9 is a diagram showing a structure of another ice maker in a closed state, in accordance with some embodiments.
Figure 10:
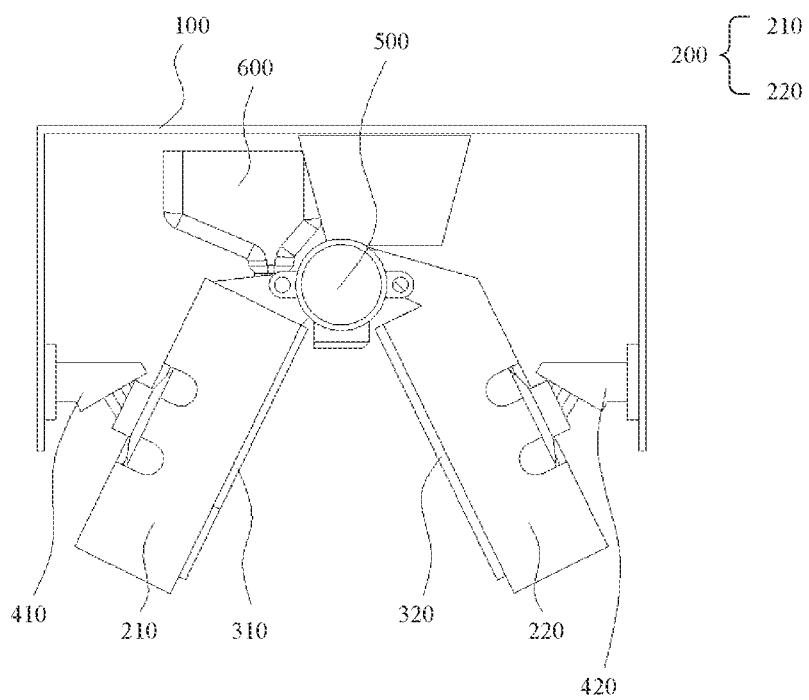
FIG. 10 is a diagram showing a structure of another ice maker in a separated state, in accordance with some embodiments.

FIGS. 3, 4, 8, and 9 show that the first sub-mold shell 401 and the second sub-mold shell 402 are in a closed state, and FIGS. 5 and 10 show that the first sub-mold shell 401 and the second sub-mold shell 402 are in a separated state.

The solution that the mold shell 400 includes a plurality of sub-mold shells is similar to a solution that the mold shell 400 includes the first sub-mold shell 401 and the second sub-mold shell 402, and the details will not be repeated herein.

In some embodiments, the mold shell 400 includes a shell body 200 and a mold body 300.

It will be noted that the shell body 200 may also be referred as a mold frame, and the mold body 300 may also be referred as a mold. The mold shell 400 is composed of the mold frame and the mold.

As shown in FIGS. 3 and 6, the shell body 200 includes a first shell portion 210 and a second shell portion 220 that are disposed opposite to each other. For example, the first shell portion 210 and the second shell portion 220 are disposed opposite to each other in the MN direction shown in FIG. 6. The first shell portion 210 is located on the M side of the second shell portion 220, the second shell portion 220 is located on the N side of the first shell portion 210, and the MN direction corresponds to the left-right direction of the shell body 200. An inner wall of the first shell portion 210 is provided with a first inner cavity (referring to FIG. 6). An inner wall of the second shell portion 220 is provided with a second inner cavity, the second inner cavity is disposed opposite to the first inner cavity, and the second inner cavity and the first inner cavity may be of a similar structure. The first shell portion 210 and the second shell portion 220 may switch between a closed state and a separated state. In the closed state, the first shell portion 210 and the second shell portion 220 are closed to form an inner cavity, and thus the inner cavity is jointly defined by the first inner cavity and the second inner cavity.

Referring to FIGS. 3 and 6, the mold body 300 is disposed in the inner cavity, and the mold body 300 includes a first mold portion 310 and a second mold portion 320.

The first mold portion 310 is connected with the first shell portion 210, so that the first mold portion 310 moves along with the first shell portion 210. For example, the first mold portion 310 is disposed in the first inner cavity of the first shell portion 210, the first mold portion 310 includes a first concave cavity 311 (referring to FIG. 6), and the first concave cavity 311 is located on a side of the first mold portion 310 facing the second mold portion 320.

The second mold portion 320 is connected with the second shell portion 220, so that the second mold portion 320 is fixed with respect to the second shell portion 220. For example, the second mold portion 320 is disposed in the second inner cavity of the second shell portion 220, the second mold portion 320 includes a second concave cavity 321 (referring to FIG. 6), and the second concave cavity 321 is disposed on a side of the second mold portion 320 facing the first mold portion 310. The first mold portion 310 and the second mold portion 320 may switch between a separated state and a closed state. In the closed state, the first mold portion 310 and the second mold portion 320 are closed to enclose the mold cavity, thus the mold cavity is jointly defined by the first concave cavity 311 and the second concave cavity 321.

Figure 13:
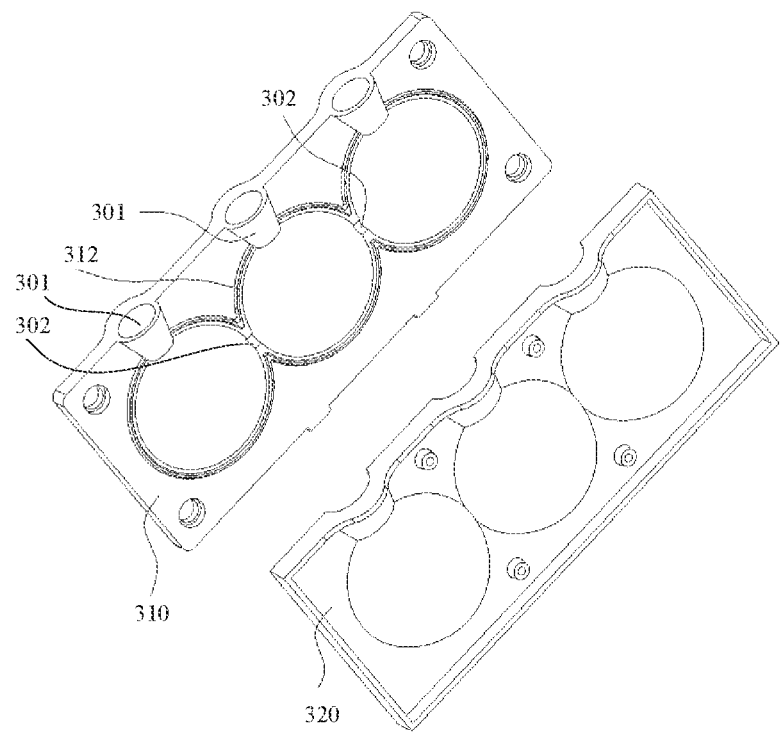
FIG. 13 is an exploded view of a mold body of an ice maker, in accordance with some embodiments.

In some embodiments, referring to FIGS. 6 and 13, a first engaging portion 312 (referring to FIG. 13) is provided on an edge of the first concave cavity 311 of the first mold portion 310, a second engaging portion 322 (referring to FIG. 6) is provided on an edge of the second concave cavity 321 of the second mold portion 320, and the second engaging portion 322 is configured to be matched with the first engaging portion.

For example, one of the first engaging portion 312 and the second engaging portion 322 includes a convex rib, and the other of the first engaging portion 312 and the second engaging portion 322 includes a groove. The groove is matched with the convex rib. In this way, the first engaging portion 312 cooperates with the second engaging portion 322, and it may be possible to improve the engaging cohesiveness between the first mold portion 310 and the second mold portion 320 and improve the aesthetics of the appearance of the ice cube, so that it may be possible to avoid a situation that the ice cube forms a convex edge at an engaging position between the first mold portion 310 and the second mold portion 320, which may cause the appearance of the ice cube to be irregular and affect the aesthetics of the appearance of the ice cube.

In some embodiments, one of the first engaging portion and the second engaging portion 322 may also be configured as a protruding portion or a raised portion, and the other one of the first engaging portion and the second engaging portion 322 may also be configured as a concave portion or a slot. As long as the first engaging portion and the second engaging portion 322 are capable of matching together, the present disclosure is not limited thereto.

In some embodiments, at least one of the first mold portion 310 and the second mold portion 320 is configured to be deformed due to an external force. For example, the first mold portion 310 and the second mold portion 320 are both silicone members.

Figure 12:
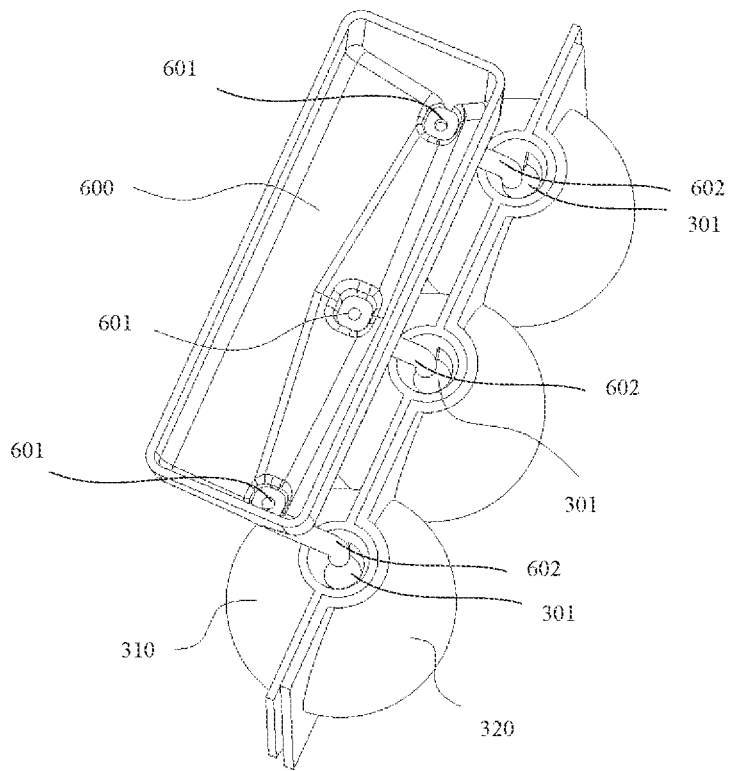
FIG. 12 is a diagram showing a structure of a water tank and a mold body of an ice maker, in accordance with some embodiments.

Referring to FIGS. 6 and 12, the mold body 300 includes a plurality of water inlets 301 in communication with the mold cavity. The upper side plate 101 includes an opening 1011 (referring to FIG. 8) disposed at a position of the upper side plate 101 corresponding to the water inlet 301, and an external water pipe is connected with the water inlet 301 by passing through the opening 1011, so as to inject water into the mold cavity. For example, the opening 1011 is formed as a rectangular through hole penetrating the upper side plate 101 in a thickness direction thereof.

In some embodiments, the mold body 300 includes a plurality of mold cavities. FIG. 12 shows an example in which the mold body 300 includes three mold cavities, and each mold cavity includes a water inlet 301. The ice maker 1001 includes a water tank 600. The water tank 600 is disposed above the shell body 200, the water tank 600 includes a plurality of water distribution pipes 602 and a plurality of water distribution ports 601 corresponding to the plurality of water inlets 301, and each water distribution port 601 is provided with a water distribution pipe 602 in communication with the water inlet 301. Referring to FIG. 4, the water tank 600 is fixed to the base 100, and an opening 1011 (referring to FIG. 8) is provided at a position of the upper side plate 101 corresponding to the water tank 600. The arrangement of the plurality of mold cavities may increase an amount of ice produced by the ice maker 1001 in a single time, and the water tank 600 provided with the plurality of water distribution ports 601 is beneficial to improve the efficiency of injecting water, thereby effectively increasing the ice making efficiency.

In some embodiments, referring to FIG. 13, the plurality of mold cavities are communicated with each other through a plurality of water holes 302. For example, the mold body 300 in FIG. 13 includes three mold cavities. Two adjacent mold cavities are communicated with each other through a water hole 302, so that water injected into a mold cavity may circulate in different mold cavities, thus water in the plurality of mold cavities tends to be average, which is beneficial to reduce weigh difference of the produced ice cubes.

Since the amount of water injected in a single time is constant, if water leaks during water injection, the amount of water injected into the mold cavity will be reduced, and the weight of the produced ice cube will be less than the predetermined weight of the ice cube, which results in a decrease in integrity of the ice cube. In some embodiments, referring to FIG. 13, the water inlet 301 is formed as a closed shape. For example, the structure defining the water inlet 301 is of an annular structure, and the water inlet 301 is defined on the inner side of the annular structure. FIG. 13 shows an example in which the water inlet 301 is in a shape of a funnel. By providing the water inlet 301 of a closed shape, it may be possible to avoid water leakage, thereby achieving good integrity of the ice cube.

Through the water inlet 301 of a closed shape, when water is injected into the mold cavity during ice making, the water will not leak at the gap between closed water inlets 301, which may avoid a situation that the demolding is unsmooth as leaked water forms the ice cube outside the mold cavity. In addition, it may also be possible to avoid that the original shape of the ice cube is damaged due to water leakage, so that the ice cube has a relatively integral shape.

In some embodiments, the water inlet 301 is formed as a separated structure. For example, as shown in FIG. 6, a first concave cavity 311 is provided on a top portion of the first mold portion 310, and a second concave cavity 321 is provided on a top portion of the second mold portion 320. In a case where the first mold portion 310 and the second mold portion 320 are in the closed state, the first concave cavity 311 and the second concave cavity 312 are closed to form the water inlet 310.

Due to the presence of manufacturing tolerances, water may leak at the water inlet 301 of the separated structure during water injection. Since the amount of water injected in a single time is constant, if water leaks during water injection, the amount of water injected into the mold cavity will be reduced, and the weight of the produced ice cube will be less than the predetermined weight of the ice cube, which results in a decrease in integrity of the ice cube.

In some embodiments, the water inlet 301 is formed as an integral structure. Referring to FIG. 13, the water inlet 301 is formed as a closed shape. For example, the water inlet 301 is formed as an annular structure, and the water inlet 301 is defined on the inner side of the annular structure. FIG. 13 shows an example in which the water inlet 301 is in the shape of the funnel. By providing the water inlet 301 of a closed shape, it may be possible to avoid water leakage, thereby achieving good integrity of the ice cube.

It can be understood that, if a half of the water inlet 301 is located in the first mold portion 310, and the other half of the water inlet 301 is located in the second mold portion 320. In a case where water leaks out of the mold cavity from an engaging position between the first mold portion 310 and the second mold portion 320, leaked water after being frozen may cause the molds to be adhered to each other, which may result in difficulty in separating the first mold portion 310 from the second mold portion 320 in a subsequent demolding process, thus resulting in an unsmooth demolding process.

In some embodiments, the water inlet 301 is formed on the first mold portion 310 or the second mold portion 320.

FIG. 13 shows an example in which the water inlet 301 is formed on the second mold portion 320, and the water inlet 301 and the second mold portion 320 form a one-piece member. Of course, in some embodiments, the water inlet 301 may also be formed on the first mold portion 310, and the water inlet 301 and the first mold portion 310 form a one-piece member. Thus, the water inlet 301 is formed on the first mold portion 310 or the second mold portion 320, rather than being formed by combing two halves of the first mold portion 310 and the second mold portion 320, thus it may be possible to reduce the difficulty of the demolding process and improve the smoothness of the demolding process.

Referring to FIG. 6, the first shell portion 210 includes a first groove 211 located on a side of the first shell portion 210 proximate to the second shell portion 220, and the second shell portion 220 includes a second groove 221 located on a side of the second shell portion 220 proximate to the first shell portion 210. In a case where the first shell portion 210 and the second shell portion 220 are in the closed state, the first groove 211 and the second groove 221 jointly define an avoidance opening 250 that encloses an outer circumference of the water inlet 301. The water inlet 301 is located within the avoidance opening 250.

As shown in FIG. 6, the first sub-mold shell 401 includes a first shell portion 210 and a first mold portion 310. The ice maker 1001 includes at least one of a first push rod 410 or a second push rod 420. The first push rod 410 or the second push rod 420 is provided in a one-to-one correspondence with the mold cavity.

The first push rod 410 is located at a first predetermined distance from the first shell portion 210 away from the second shell portion 220, and the first push rod 410 is fixed to the left side plate 102. It will be noted that, the first predetermined distance is a distance set based on a length of the first push rod 410 and the size of the internal space of the ice maker 1001. The first shell portion 210 includes a first through hole 212 disposed on a back portion of the first shell portion 210. The first through hole 212 is matched with the first push rod 410. For example, in FIG. 6, the first shell portion 210 includes the first through hole 212. The first push rod 410 is provided on the first predetermined distance from the M side of the first shell portion 210. In FIG. 5, the first push rod 410 passes through the through hole 212.

The ice maker 1001 further includes a second push rod 420 located at a second predetermined distance from the second shell portion 220 away from the first shell portion 210. The second push rod 420 is fixed to the right side plate 103, the second shell portion 220 includes a second through hole 222 (referring to FIG. 4), and the second through hole 222 is matched with the second push rod 420. It will be noted that, the second predetermined distance is a distance set based on a length of the second push rod 420 and the size of the internal space of the ice maker 1001.

Figure 7:
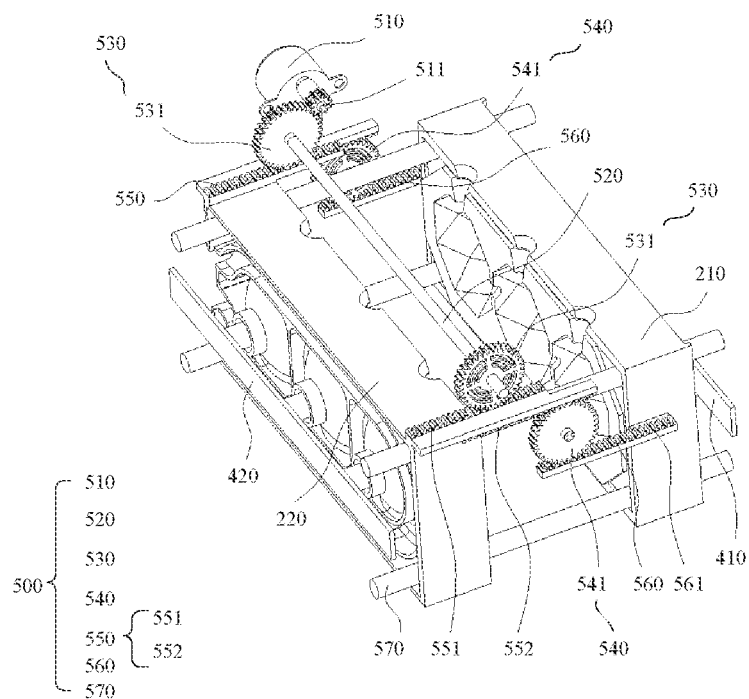
FIG. 7 is a diagram showing a structure of a driving mechanism and a shell body of an ice maker, in accordance with some embodiments.

In some embodiments, referring to FIGS. 4 and 7, a side surface of the first push rod 410 adjacent to the first mold portion 310 is matched with a contour surface of the first concave cavity of the first mold portion 310, and a side surface of the second push rod 420 adjacent to the second mold portion 320 is matched with a contour surface of the second concave cavity of the second mold portion 320. As a result, the first push rod 410 is easily pushed against the first mold portion 310, so that the first mold portion 310 may be effectively deformed; and the second push rod 420 is easily pushed against the second mold portion 320, so that the second mold portion 320 may be effectively deformed, thereby demolding the ice cube in the first mold portion 310 and the second mold portion 320.

The driving mechanism 500 is configured to drive the first sub-mold shell 401 and the second sub-mold shell 402 to move. For example, the driving mechanism 500 is configured to drive the first shell portion 210 and the second shell portion 220 to move, so that the first shell portion 210 and the second shell portion 220 are separated or closed. The first mold portion 310 moves along with the first shell portion 210, and the second mold portion 320 moves along with the second shell portion 220. In FIG. 4, the first shell portion 210 and the second shell portion 220 are in a closed state; and in FIG. 5, the first shell portion 210 and the second shell portion 220 are in the separated state.

In an actual ice making process, when the first shell portion 210 is separated from the second shell portion 220, the ice cube may be adhered to the first mold portion 310 or the second mold portion 320. In some embodiments, upon demolding, the driving mechanism 500 drives the first shell portion 210 to move to a first predetermined position, and the first push rod 410 passes through the first through hole 212 to push against the first mold portion 310, so that the first mold portion 310 is deformed due to stress. At the same time, the driving mechanism 500 drives the second shell portion 220 to move to a second predetermined position, and the second push rod 420 passes through the second through hole 222 to push against the second mold portion 320, so that the second mold portion 320 is deformed due to stress.

For example, as shown in FIG. 5, the driving mechanism 500 drives the first shell portion 210 to move toward the first push rod 410 to the first predetermined position, so that the first push rod 410 passes through the first through hole 212 to push against the first mold portion 310, and the first mold portion 310 is thus deformed due to stress, thereby demolding the ice cube in the first mold portion 310. In addition, the driving mechanism 500 drives the second shell portion 220 to move toward the second push rod 420 to the second predetermined position, so that the second push rod 420 passes through the second through hole 222 to push against the second mold portion 320, and the second mold portion 320 is thus deformed due to stress, thereby demolding the ice cube in the second mold portion 320.

Therefore, the ice cube in the first mold portion 310 or the second mold portion 320 may be pushed out, so that the ice cube may fallen into an ice storage box of the refrigerator 1 for access by the user, which has a good demolding effect.

The refrigerator 1 according to some embodiments of the present disclosure includes an ice maker 1001, the ice maker 1001 includes an ice tray, the ice tray includes a first sub-mold shell 401 and a second sub-mold shell 402 that are both movable, so that the first sub-mold shell 401 and the second sub-mold shell 402 may switch between the separated state and the closed state. The ice maker 1001 is adapted to make specially shaped ice cubes that may be only formed when the first sub-mold shell 401 cooperates with the second sub-mold shell 402, such as spherical ice cubes or polyhedral ice cubes.

In addition, the first sub-mold shell 401 is movable, and the first push rod 410 is provided on a side of the first sub-mold shell 401 away from the second sub-mold shell 402. The second sub-mold shell 402 is movable, and the second push rod 420 is provided on a side of the second sub-mold shell 402 away from the first sub-mold shell 401. Upon demolding, when the first sub-mold shell 401 moves to the first predetermined position, the first push rod 410 may push out the ice cube in the first mold portion 310. When the second sub-mold shell 402 moves to the second predetermined position, the second push rod 420 may push out the ice cube in the second mold portion 320. The demolding structure is simple and the demolding effect is reliable.

In some embodiments, two sets of driving mechanisms 500 may be used to control the first shell portion 210 and the second shell portion 220, respectively.

In some embodiments, a same driving mechanism 500 may be used to control the opening-closing movement manner of the first shell portion 210 and the second shell portion 220. The opening-closing movement manner of the first shell portion 210 and the second shell portion 220 at least includes a translational manner and a rotational manner. Hereinafter, a matched driving mechanism 500 is provided with respect to the translational manner or the rotational manner.

Referring to FIG. 7, in a case where the first shell portion 210 and the second shell portion 220 adopt a translational opening-closing movement, the driving mechanism 500 includes a motor 510, a main rotating shaft 520, a first gear set 530, a second gear set 540, a first rack 550, a second rack 560, and a slide rod 550.

Referring to FIG. 5, the driving mechanism 500 includes two first racks 550 that are disposed on two sides of the top portion of the second shell portion 220 in a movement direction thereof (e.g., the movement direction is the left-right direction, and an arrangement direction of the two first racks 550 is the front-rear direction). The first rack 550 includes a first upper teeth portion 551 and a first lower teeth portion 552.

The driving mechanism 500 includes two second racks 560 that are disposed on two sides of the middle portion of the first shell portion 210 in a movement direction thereof (e.g., the movement direction is the left-right direction, and an arrangement direction of the two second racks 560 is the front-rear direction). The second rack 560 includes a second upper teeth portion 561.

The driving mechanism 500 includes a plurality of slide rods 570. For example, the driving mechanism 500 includes two or four slide rods 570. In a case where the driving mechanism includes two slide rods 570, the two slide rods 570 are inserted through two corners of the first shell portion 210 and the second shell portion 220. In a case where the driving mechanism 500 includes four slide rods 570, the four slide rods 570 are inserted through four corners of the first shell portion 210 and the second shell portion 220.

For example, the motor 510 is connected with the main rotating shaft 520. A motor shaft of the motor 510 is connected with the main rotating shaft 520. Alternatively, the motor 510 is connected with the first gear set 530 through a transmission gear 511, and the first gear set 530 is connected with the main rotating shaft 520.

The motor 510 may be fixed to the front side plate 104, as shown in FIG. 4, the main rotating shaft 520 may be rotatably disposed on the front side plate 104 and the rear side plate through a bearing.

As shown in FIG. 7, the first gear set 530 includes two first sub-gears 531. Two first sub-gears 531 are disposed on two ends of the main rotating shaft 520, and each first sub-gear 531 is engaged with the first upper teeth portion 551 corresponding to the first rack 550. The second gear set 540 includes two second sub-gears 541 that are rotatably disposed on the front side plate 104 and the rear side plate through a bearing, respectively. The second upper teeth portion 561 of the second rack 560 is engaged with the first lower teeth portion 552 of the first rack 550 through the second gear set 540, so that the first shell portion 210 and the second shell portion 220 may translate in an opposite direction along the slide rod 570.

In this way, the motor 510 drives the transmission gear 511 to rotate, the transmission gear 511 drives the first gear set 530 to rotate, the first gear set 530 drives the main rotating shaft 520 to rotate, the first gear set 530 drives the first upper teeth portion 551 to move, the first upper teeth portion 551 drives the first lower teeth portion 552 to move, the first lower teeth portion 552 drives the second gear set 540 to rotate, and the second gear set 540 drives the second rack 560 to move, so that the first shell portion 210 and the second shell portion 220 translate in the opposite direction along the slide rod 570. FIG. 4 shows that the driving mechanism 500 drives the first shell portion 210 and the second shell portion 220 to move to be in the closed state, and FIG. 5 shows that the driving mechanism 500 drives the first shell portion 210 and the second shell portion 220 to move to be in the separated state.

In some embodiments, a position of the first rack 550 and a position of the second rack 560 may be interchanged, other structures remain unchanged, and the operation principle is the same.

As shown in FIG. 5, in a process when the driving mechanism 500 drives the first shell portion 210 and the second shell portion 220 to move to be in the separated state, the first sub-mold shell 401 and the second sub-mold shell 402 move away from each other simultaneously. When the first sub-mold shell 401 moves to the first predetermined position, the second sub-mold shell 402 moves to the second predetermined position, and the second push rod 420 pushes out the ice cube in the second mold portion 320 when the first push rod 410 pushes out the ice cube in the first mold portion 310. In this way, the ice cube in the first mold portion 310 or the ice cube in the second mold portion 320 is pushed out. The above structure for demolding the ice cube is simple, has a high demolding efficiency, is not prone to failure, and is easy to operate.

Figure 11:
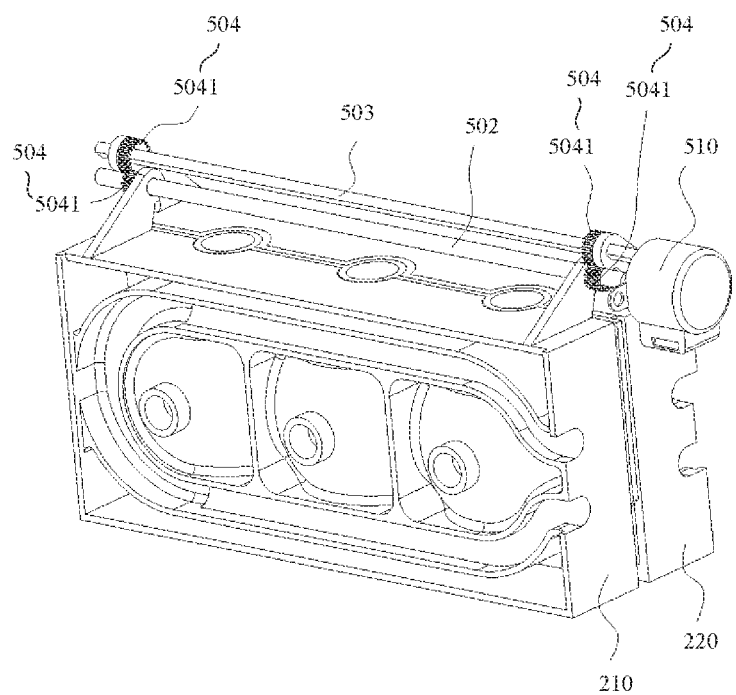
FIG. 11 is a diagram showing a structure of a driving mechanism and a shell body of another ice maker, in accordance with some embodiments.

Referring to FIG. 11, in a case where the first shell portion 210 and the second shell portion 220 adopt a rotational opening-closing movement, the driving mechanism 500 includes a motor 510, a first rotating shaft 502, a second rotating shaft 503, and a third gear set 504.

The first shell portion 210 is connected with the first rotating shaft 502, and the second shell portion 220 is connected with the second rotating shaft 503.

The third gear set 504 includes four third sub-gears 5041. Two third sub-gears 5041 of the four third sub-gears 5041 are disposed on two ends of the first rotating shaft 502, and the other two third sub-gears 5041 of the four third sub-gears 5041 are disposed on two ends of the second rotating shaft 503. Two third sub-gears located on a same end of the first rotating shaft 502 and the second rotating shaft 503 are drivingly connected with each other.

The motor 510 is connected with the first rotating shaft 502 or the second rotating shaft 503 (FIG. 11 shows that the motor 510 is connected with the second rotating shaft 503), so that the first shell portion 210 and the second shell portion 220 may rotate in an opposite direction. FIGS. 8 and 9 show that the driving mechanism 500 drives the first shell portion 210 and the second shell portion 220 to move to be in the closed state, and FIG. 10 shows that the driving mechanism 500 drives the first shell portion 210 and the second shell portion 220 to move to be in the separated state.

As shown in FIG. 10, in a process when the driving mechanism 500 drives the first shell portion 210 and the second shell portion 220 to rotate to be in the separated state, the first sub-mold shell 401 and the second sub-mold shell 402 rotate away from each other simultaneously. When the first sub-mold shell 401 rotates to a third predetermined position, the second sub-mold shell 402 rotates to a fourth predetermined position, and the second push rod 420 pushes out the ice cube in the second mold portion 320 when the first push rod 410 pushes out the ice cube in the first mold portion 310. In this way, the ice cube in the first mold portion 310 or the ice cube in the second mold portion 320 is pushed out. The above structure for demolding the ice cube is simple, has a high demolding efficiency, is not prone to failure, and is easy to operate.

Figure 14:
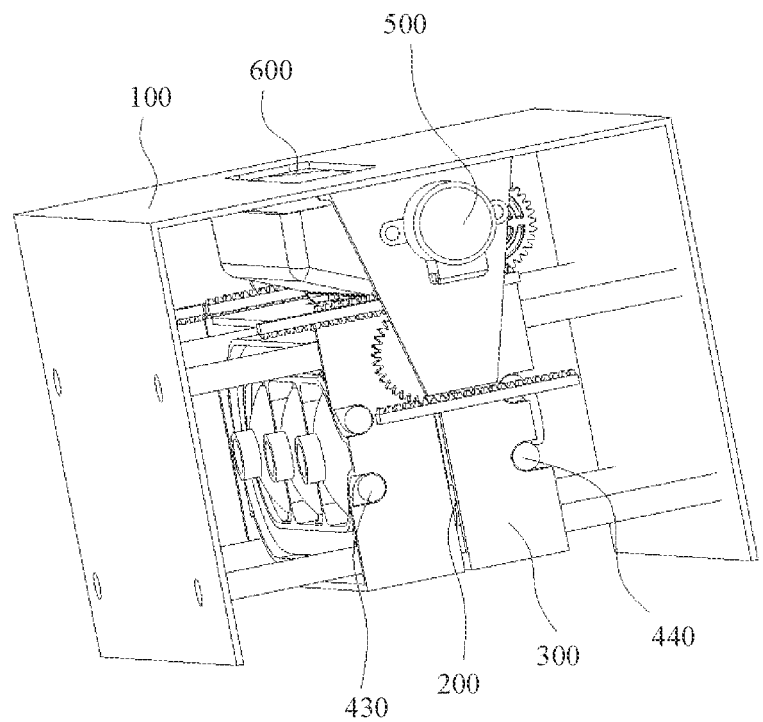
FIG. 14 is a diagram showing a structure of yet another ice maker, in accordance with some embodiments.
Figure 15:
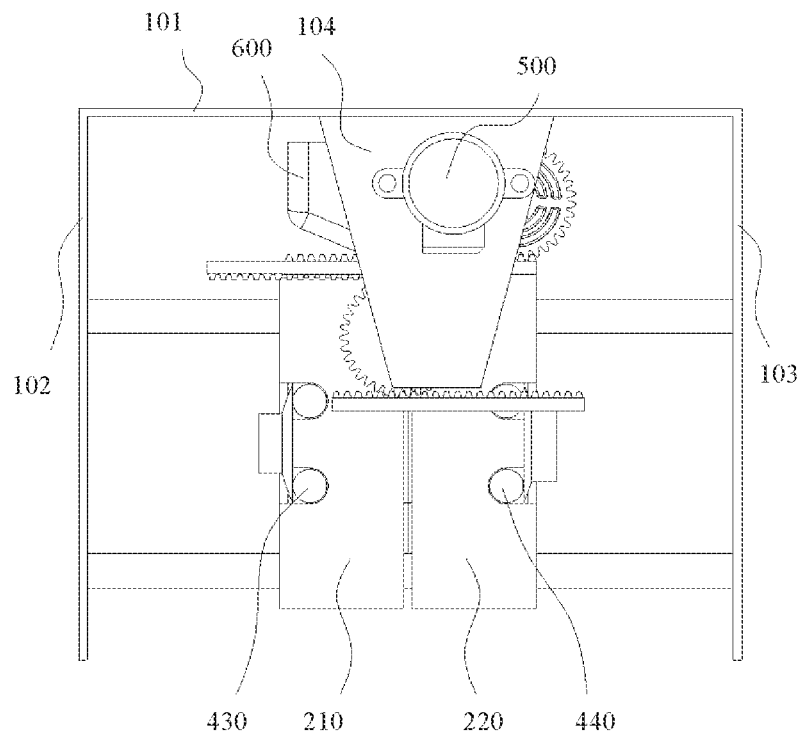
FIG. 15 is a diagram showing a structure of yet another ice maker in a closed state, in accordance with some embodiments.
Figure 16:
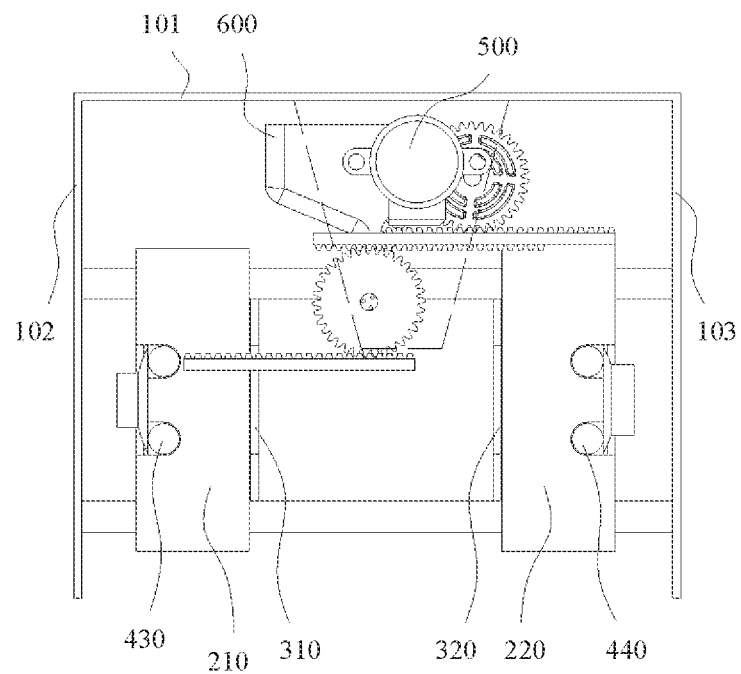
FIG. 16 is a diagram showing a structure of yet another ice maker in a separated state, in accordance with some embodiments.
Figure 17:
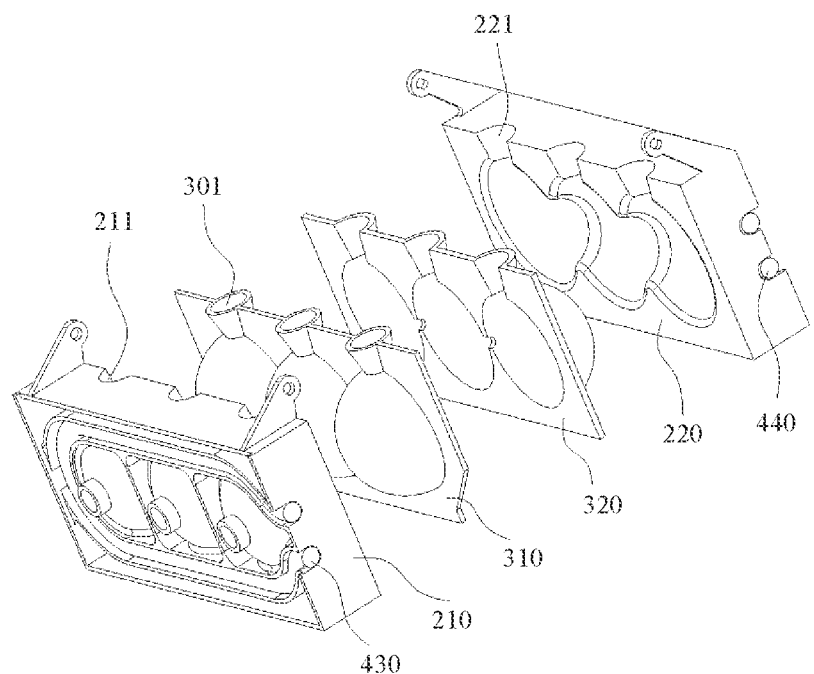
FIG. 17 is an exploded view of a shell body and a mold body of yet another ice maker, in accordance with some embodiments.
Figure 18:
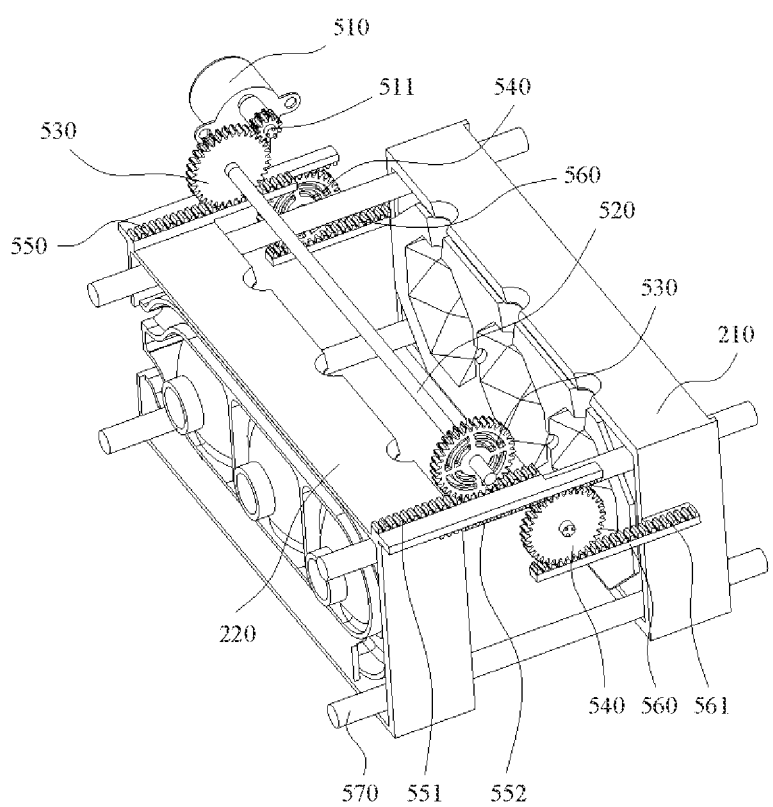
FIG. 18 is a diagram showing a structure of a driving mechanism and a shell body of yet another ice maker, in accordance with some embodiments.

In some embodiments, as shown in FIGS. 14 to 21, the ice maker 1001 may also not be provided with the first push rod 410 and the second push rod 420. In this case, as shown in FIGS. 14 to 16, the ice maker 1001 further includes at least one of a first heating mechanism 430 or a second heating mechanism 440. The first heating mechanism 430 or the second heating mechanism 440 is provided in a one-to-one correspondence with the mold cavity.

Figure 19:
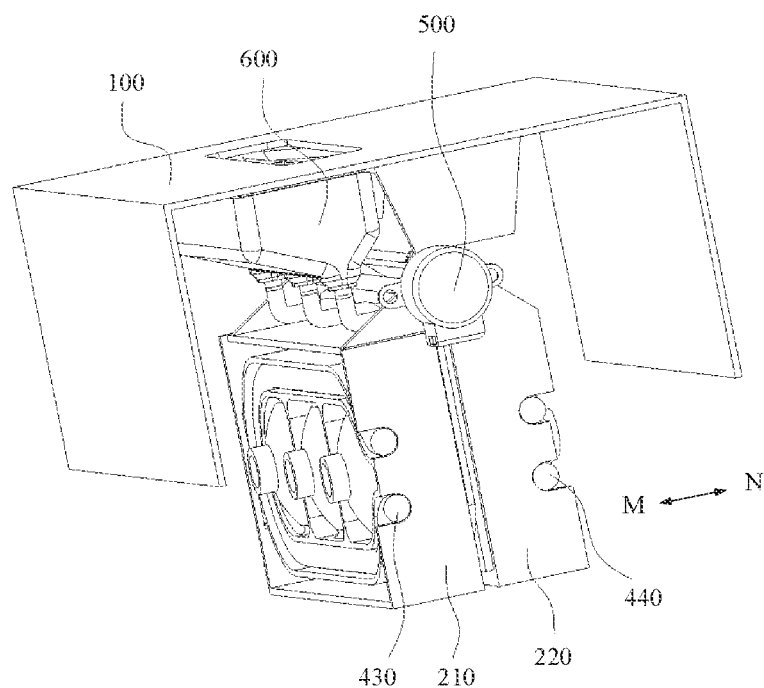
FIG. 19 is a diagram showing a structure of yet another ice maker, in accordance with some embodiments.
Figure 20:
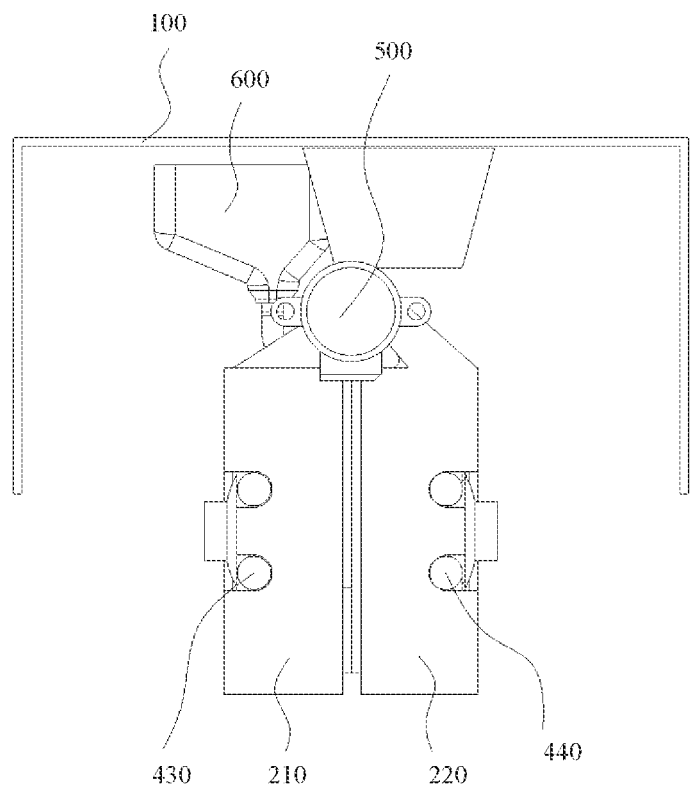
FIG. 20 is a diagram showing a structure of yet another ice maker in a closed state, in accordance with some embodiments.
Figure 21:
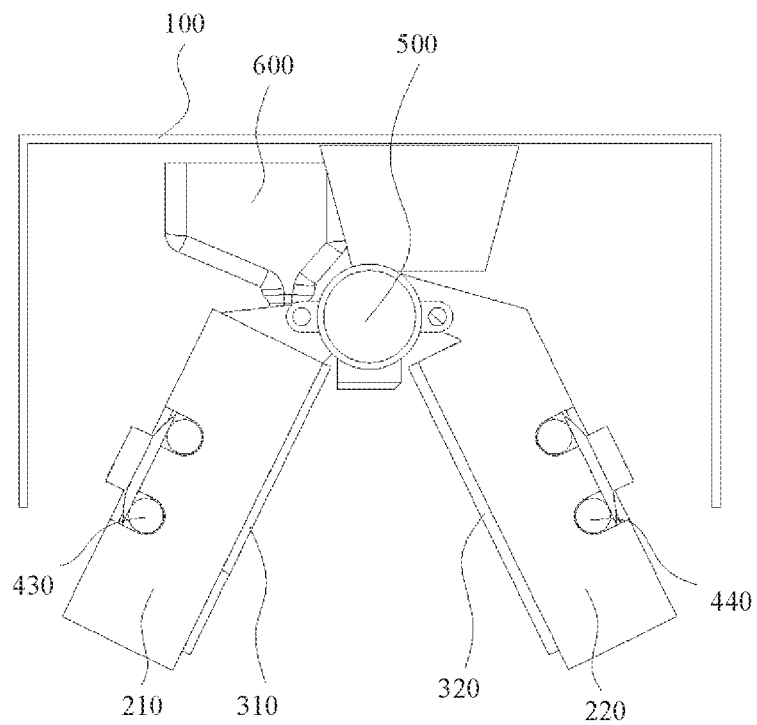
FIG. 21 is a diagram showing a structure of yet another ice maker in a separated state, in accordance with some embodiments.

As shown in FIG. 19, the first heating mechanism 430 is disposed on a side of the first shell portion 210 away from the second shell portion 220. For example, the first heating mechanism 430 is disposed on the M side of the first shell portion 210 in FIG. 19. The second heating mechanism 440 is disposed on a side of the second shell portion 220 away from the first shell portion 210. For example, the second heating mechanism 440 is disposed on the N side of the second shell portion 220 in FIG. 19.

In some embodiments, referring to FIG. 11, the first heating mechanism 430 or the second heating mechanism 440 includes a U-shaped heating tube.

Upon demolding, the first heating mechanism 430 and the second heating mechanism 440 are started up to heat the first shell portion 210 and the second shell portion 220, respectively, and the heat is conducted to the first mold portion 310 and the second mold portion 320, so that the outer wall of the ice cube is melted, and the ice cube is thus separated from inner walls of the first mold portion 310 and the second mold portion 320. The driving mechanism 500 then drives the first shell portion 210 to be separated from the second shell portion 220, so that the ice cube falls into the ice storage box for access by the user.

As shown in FIG. 11, after the first heating mechanism 430 and the second heating mechanism 440 heat the first shell portion 210 and the second shell portion 220, so that the ice cubes are separated from the first mold portion 310 and the second mold portion 320, in a process when the driving mechanism 500 drives the first shell portion 210 and the second shell portion 220 to rotate to be in the separated state, the first sub-mold shell 401 and the second sub-mold shell 402 rotate away from each other simultaneously. When the first sub-mold shell 401 rotates to the third predetermined position, the second sub-mold shell 402 rotates to a fourth predetermined position, and the ice cube falls into the ice storage box due to gravity. The above structure for demolding the ice cube is simple, has a high demolding efficiency, is not prone to failure, and is easy to operate.

Since the outer wall of the ice cube is melted through the heat from the first heating mechanism 430 and the second heating mechanism 440 in the above demolding process, the first mold portion 310 and the second mold portion 320 are not deformed, so that the mold shell 400 may be formed as a shell body 200 provided with the mold cavity. In this case, the mold body 300 may not be provided.

In some embodiments, the driving mechanism 500 is configured to drive the first sub-mold shell 401 to move, and the second sub-mold shell 402 is fixed. For example, the driving mechanism 500 is configured to drive the first shell portion 210 to move, so that the first shell portion 210 is separated from or closed with the second shell portion 220 that is fixed, the first mold portion 310 moves along with the first shell portion 210, and the second mold portion 320 is fixed with respect to the second shell portion 220.

Figure 22:
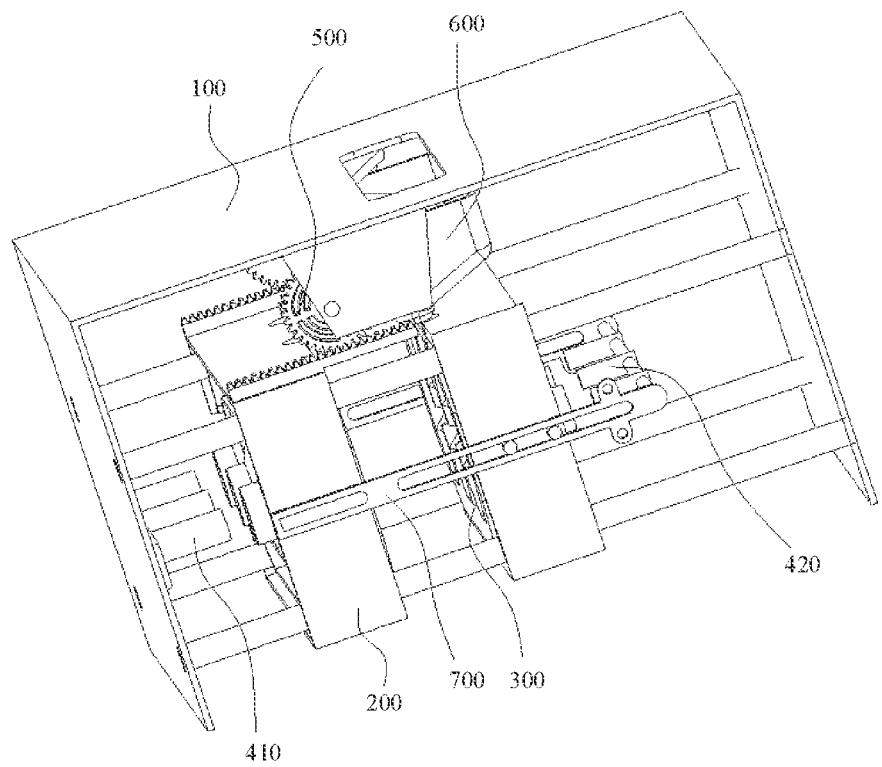
FIG. 22 is a diagram showing a structure of yet another ice maker in a separated state, in accordance with some embodiments.
Figure 23:
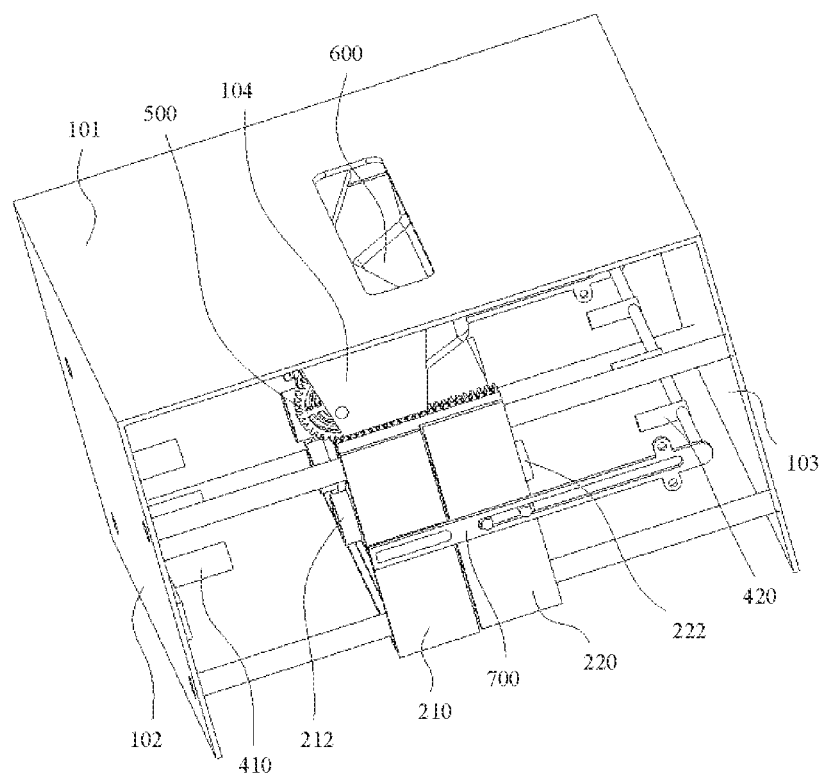
FIG. 23 is a diagram showing a structure of yet another ice maker in a closed state, in accordance with some embodiments.

In some embodiments, as shown in FIGS. 22 and 23, the ice maker 1001 further includes a connecting rod assembly 700, the first push rod 410 is fixed, and the second push rod 420 is linked with the first shell portion 210 through the connecting rod assembly 700. FIG. 22 shows that the driving mechanism 500 drives the first shell portion 210 and the second shell portion 220 to be in a separated state, and FIG. 23 shows that the driving mechanism 500 drives the first shell portion 210 and the second shell portion 220 to be in a closed state.

Upon demolding, the driving mechanism 500 drives the first shell portion 210 to move to a predetermined position, and the first push rod 410 passes through the first through hole 212 to push against the first mold portion 310, thus the first mold portion 310 is deformed due to stress. Since the second push rod 420 is linked with the first shell portion 210 through the connecting rod assembly 700, the second push rod 420 may be moved through the movement of the first shell portion 210, and the second push rod 420 passes through the second through hole 222 to push against the second mold portion 320, thus the second mold portion 320 is deformed due to stress.

Figure 24:
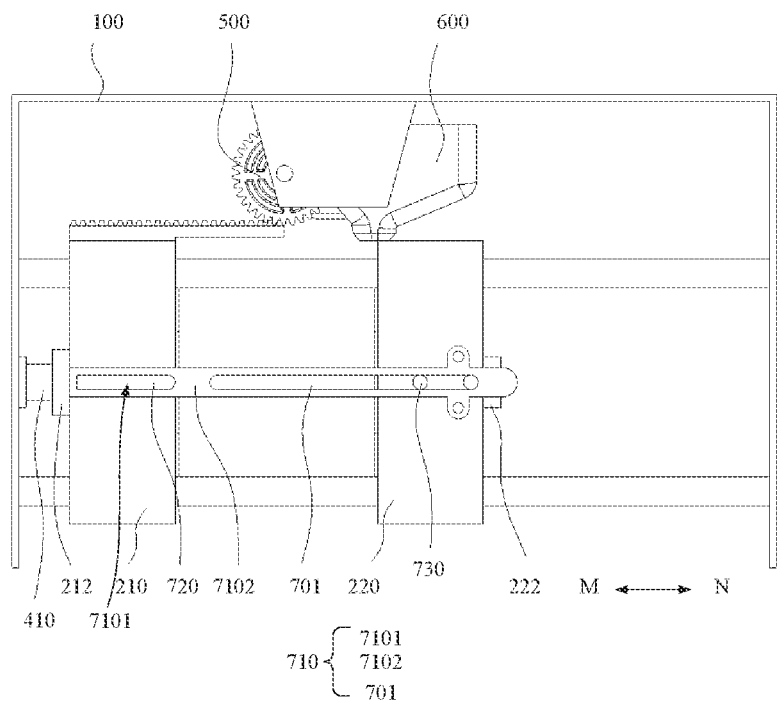
FIG. 24 is a diagram showing a structure of yet another ice maker in a separated state, in accordance with some embodiments.

For example, as shown in FIG. 24, the driving mechanism 500 drives the first shell portion 210 to move toward the first push rod 410 to the predetermined position, so that the first push rod 410 passes through the first through hole 212 to push against the first mold portion 310, and the first mold portion 310 is deformed due to stress, thus the ice cube in the first mold portion 310 is demolded. In addition, the first shell portion 210 drives the second push rod 420 to move toward the second through hole 222 through the connecting rod assembly 700, so that the second push rod 420 passes through the second through hole 222 to push against the second mold portion 320, and the second mold portion 320 is deformed due to stress, thus the ice cube in the second mold portion 320 is demolded.

Figure 26:
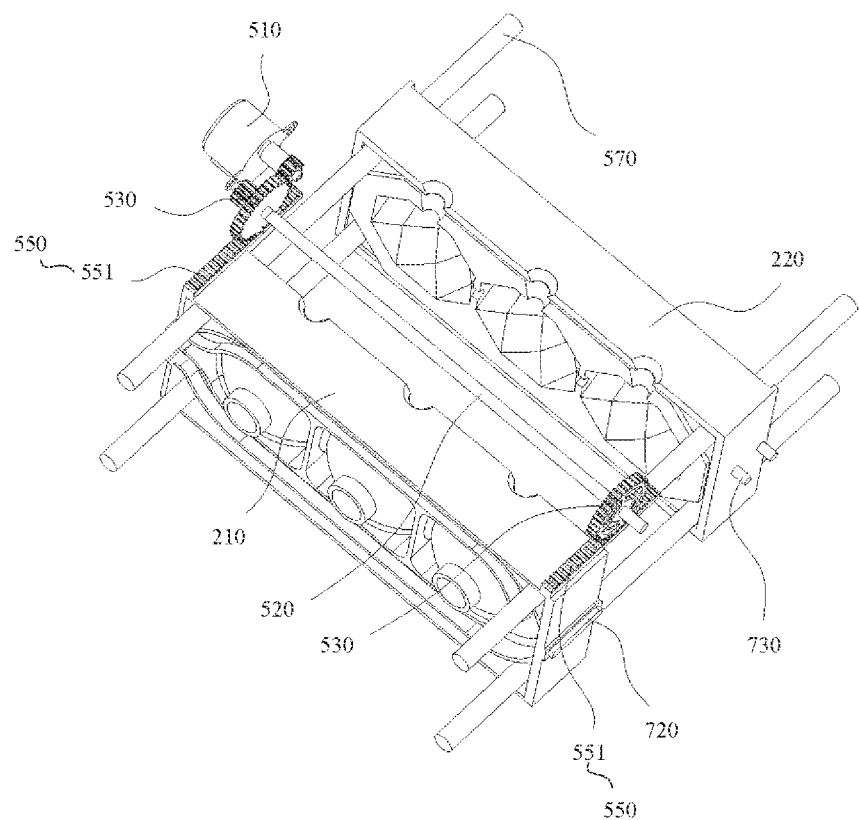
FIG. 26 is a diagram showing a structure of a driving mechanism and a shell body of yet another ice maker, in accordance with some embodiments.

In some embodiments, referring to FIG. 26, in a case where the first shell portion 210 adopts a translational opening-closing movement, the driving mechanism includes a motor 510, a main rotating shaft 520, a first gear set 530, a first rack 550, and a slide rod 570. A main difference between FIG. 26 and FIG. 7 is that the driving mechanism 500 shown in FIG. 26 does not include the second gear set 540 and the second rack 560, and the first rack 550 only includes the first upper teeth portion 551 and does not include the first lower teeth portion 552.

As shown in FIG. 26, the driving mechanism 500 includes two first racks 550 disposed on two sides of the top portion of the first shell portion 210 or the second shell portion 220 in the movement direction thereof (e.g., the movement direction is the left-right direction, and the arrangement direction of the two first racks 550 is the front-rear direction).

For example, the two first racks 550 are disposed on two sides of the top portion of the first shell portion 210 in the movement direction thereof. The motor 510 is connected with the main rotating shaft 520, and the first rack 550 is drivingly connected with the main rotating shaft 520 through the first gear set 530. Therefore, the motor 510 may drive the main rotating shaft 520 to rotate, the main rotating shaft 520 drives the first gear set 530 to rotate, and the first gear set 530 drives the first rack 550 to move, so that the first shell portion 210 translates along the slide rod 570. FIG. 23 shows that the driving mechanism 500 drives the first shell portion 210 to move to be in a closed state with the second shell portion 220, and FIG. 24 shows that the driving mechanism 500 drives the first shell portion 210 to move to be in a separated state with the second portion 220.

Referring to FIG. 24, in a case where the first shell portion 210 adopts a translational opening-closing movement, the connecting rod assembly 700 includes a first connecting rod 710, a first buckle portion 720, and a second buckle portion 730. It will be noted that, in some embodiments of the present disclosure, that the shell portion adopts a translational opening-closing movement means that the first shell portion 210 or the second shell portion 220 drives any one of shell portions or any one of mold portions to move in a translational opening-closing manner through a translational driving system (i.e., a translational rack and a slide rod). The function of the translational opening-closing movement is to ensure that the position of the shell portion and the mold portion before and after the opening-closing movement is fixed, so that there is no positional deviation due to the movement, which makes the translational opening-closing movement more reliable. As a result, it may be possible to avoid a situation that two mold portions are not sealed tightly and form gaps, thus water may leak out of the mold cavity from a mold-closing line of the water injecting hole during water injecting, and the regularity and appearance of the ice cube may be affected due to the difficulty of demolding when the ice making process is completed.

Figure 25:
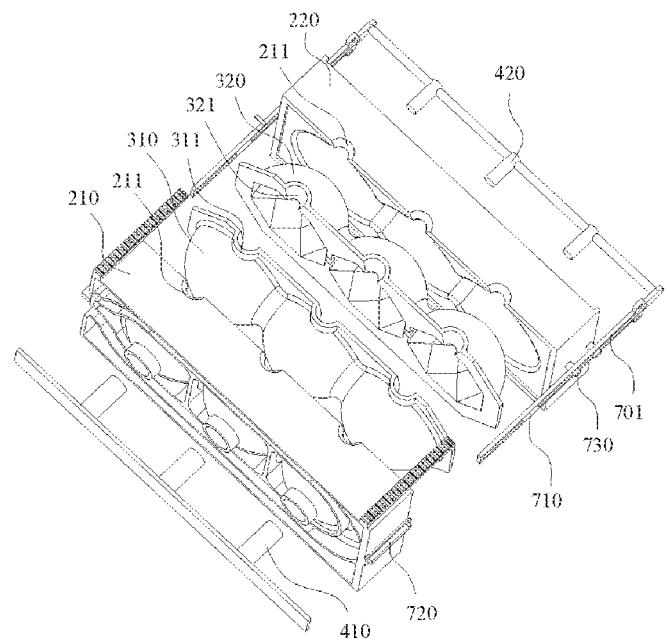
FIG. 25 is an exploded view of a shell body and a mold body of yet another ice maker, in accordance with some embodiments.

In some embodiments, an extending direction of the first connecting rod 710 is substantially the same as the movement direction of the first shell portion 210. For example, when the first shell portion 210 moves in the MN direction in FIG. 24, the first connecting rod 710 is in a shape of a straight rod extending in the MN direction. The first connecting rod 710 includes a first connecting rod body 7102 and a fixing hole 7101 penetrating the first connecting rod body 7102 in a thickness direction thereof. The fixing hole 7101 is provided on an end of the first connecting rod body 7102 adjacent to the first shell portion 210, and the other end of the first connecting rod body 7102 adjacent to second shell portion 220 is connected with the second push rod 420 (referring to FIG. 25). For example, at least one of the front surface or the rear surface of the first shell portion 210 is provided with the first buckle portion 720, the first buckle portion 720 is matched with the fixing hole 7101, so that the first shell portion 210 is connected with the first connecting rod body 7102. The first buckle portion 720 may be formed as a convex structure that extends in a same direction as the first rack 550.

The first connecting rod 710 further includes a first strip-shaped hole 701, the first strip-shaped hole 701 is formed as a through hole penetrating the first connecting rod body 7102 in the thickness direction thereof, and the first strip-shaped hole 701 is closer to the second push rod 420 than the fixing hole 7101. At least one of the front surface or the rear surface of the second shell portion 220 is provided with the second buckle portion 730, and the second buckle portion 73 is inserted through the first strip-shaped hole 701, so that the first connecting rod body 7102 translates with respect to the second buckle portion 730. The front surface (or the rear surface) of the second shell portion 220 is provided with one or more second buckle portions 730, and the second buckle portion 730 may be formed as a shaft-like structure that extends away from the front surface or the rear surface of the second shell portion 220.

Figure 27:
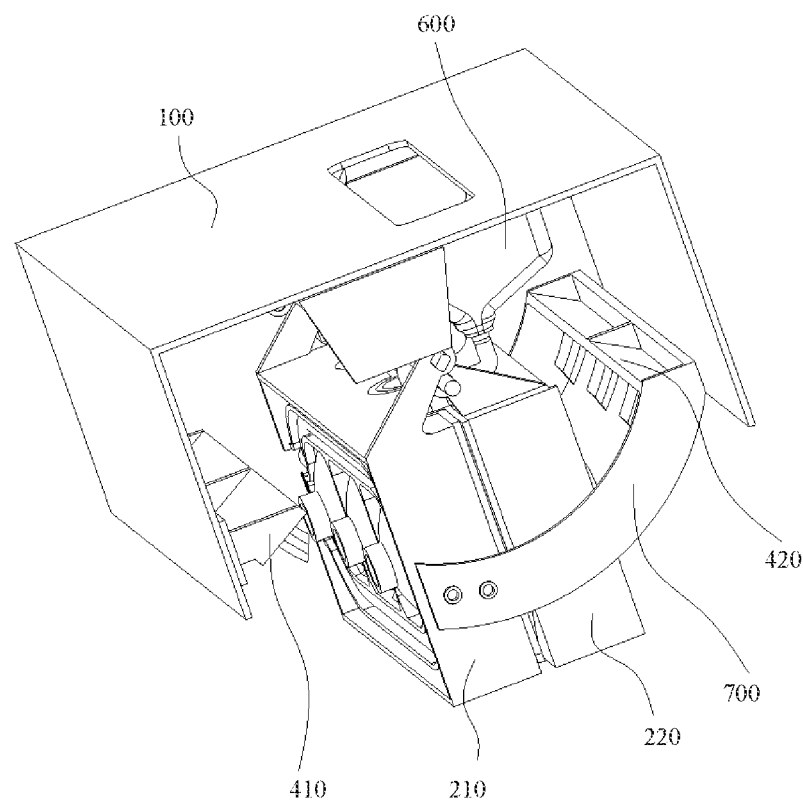
FIG. 27 is a diagram showing a structure of yet another ice maker, in accordance with some embodiments.
Figure 28:
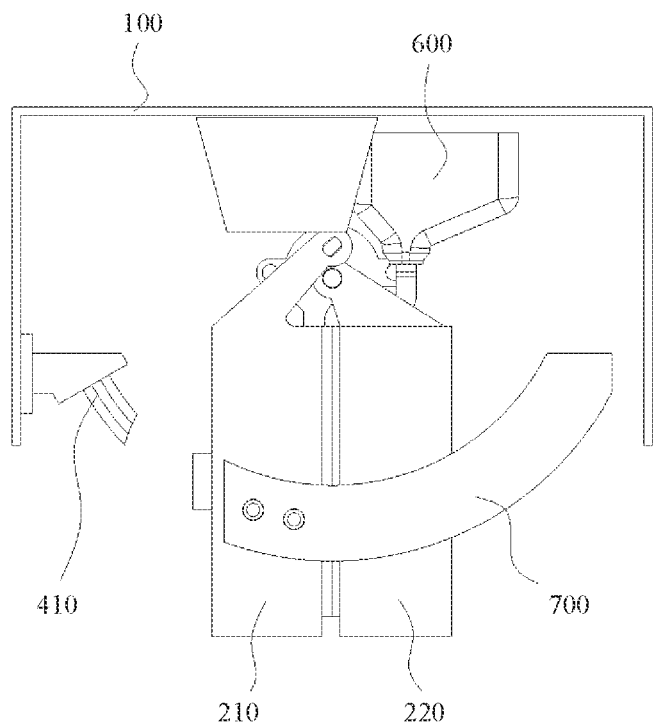
FIG. 28 is a diagram showing a structure of yet another ice maker in a closed state, in accordance with some embodiments.
Figure 29:
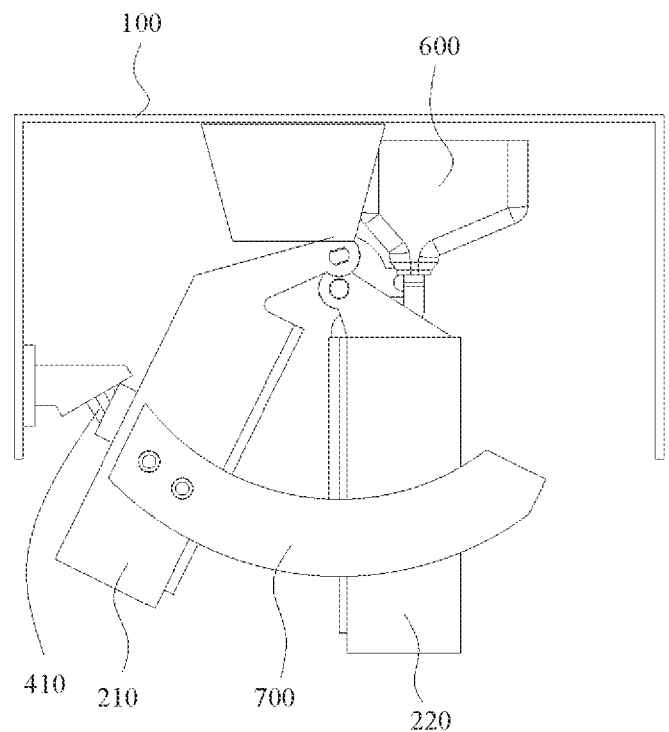
FIG. 29 is a diagram showing a structure of yet another ice maker in a separated state, in accordance with some embodiments.
Figure 30:
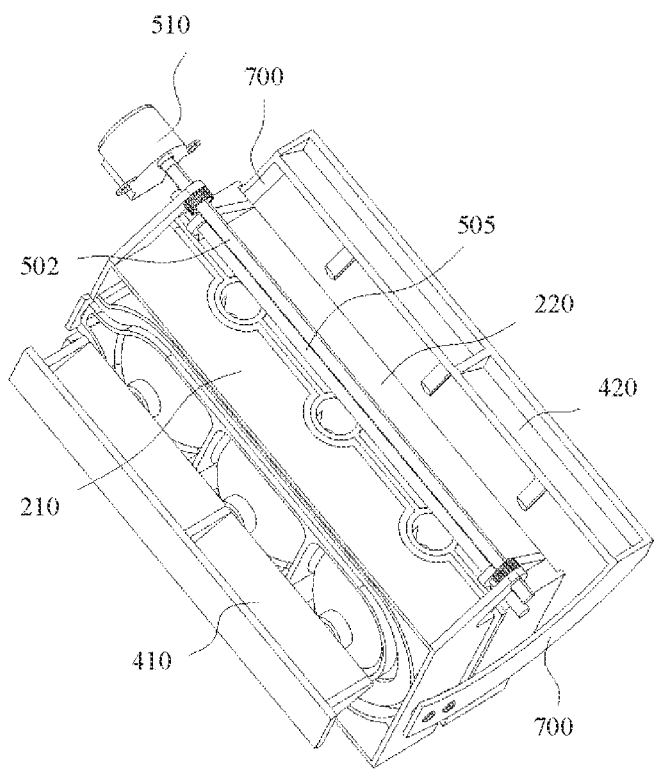
FIG. 30 is a diagram showing a structure of a driving mechanism and a shell body of yet another ice maker, in accordance with some embodiments.

Referring to FIG. 30, in a case where the first shell portion 210 adopts a rotational opening-closing movement, the driving mechanism 500 includes a motor 510 and a first rotating shaft 502, and the motor 510 is connected with the first rotating shaft 502, so as to drive the first rotating shaft 502 to rotate. The first shell portion 210 is connected with the first rotating shaft 502, so that the first shell portion 210 may rotate in a predetermined direction through the rotation of the first rotating shaft 502. FIGS. 27 and 28 show that the driving mechanism 500 drives the first shell portion 210 to move to be in a closed state with the second shell portion 220, and FIG. 29 shows that the driving mechanism drives the first shell portion 210 to move to be in a separated state with the second shell portion 220.

Referring to FIG. 27, in a case where the first shell portion 210 adopts a rotational opening-closing movement, the extending direction of the connecting rod assembly 700 is substantially the same as the movement direction of the first shell portion 210. For example, the connecting rod assembly 700 is formed as a plate, an end of the connecting rod assembly 700 adjacent to the first shell portion 210 is connected (e.g., by a screw) with the first shell portion 210, and the other end of the connecting rod assembly 700 adjacent to the second shell portion 220 is connected with the second push rod 420, so that the second push rod 420 is linked with the first shell portion 210 through the connecting rod assembly 700.

In some embodiments, referring to FIG. 30, the ice maker 1001 further includes a fixing shaft 505, through which the second shell portion 220 is connected with the base 100. In some embodiments, the second shell portion 220 is connected with the fixing shaft 505. Alternatively, the second shell portion 220 is directly in fixed connection with the base 100.

Figure 31:
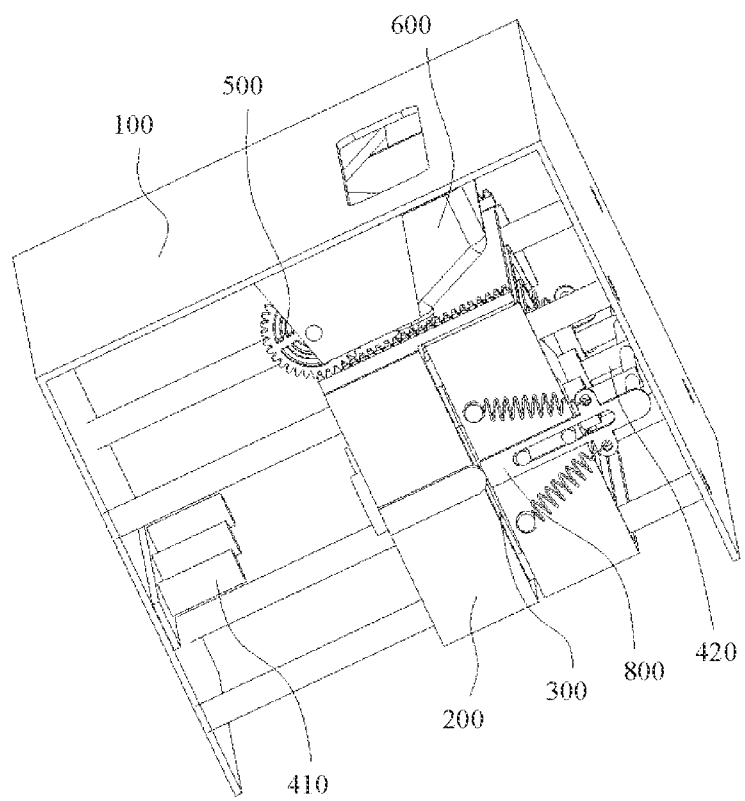
FIG. 31 is a diagram showing a structure of yet another ice maker, in accordance with some embodiments.
Figure 32:
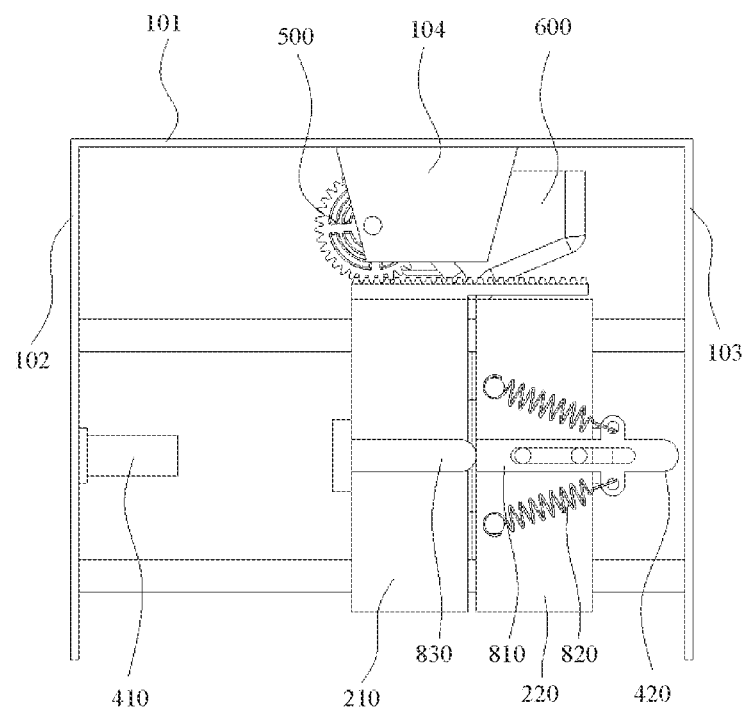
FIG. 32 is a diagram showing a structure of yet another ice maker in a closed state, in accordance with some embodiments.

In some embodiments, as shown in FIG. 31, the ice maker 1001 further includes an elastic assembly 800. A main difference between FIGS. 31 and 32 is that the ice maker 1001 shown in FIG. 31 does not include the connecting rod assembly 700, and the second push rod 420 is connected with the second shell portion 220 through the elastic assembly 800. The elastic assembly 800 may switch between a stretched state and a reset state. In the stretched state, the first shell portion 210 and the second shell portion 220 are in the closed state; and in the reset state, the first shell portion 210 and the second shell portion 220 are in the separated state. The driving mechanism 500 drives the first shell portion, so that the elastic assembly 800 may switch between the stretched state and the reset state.

Figure 33:
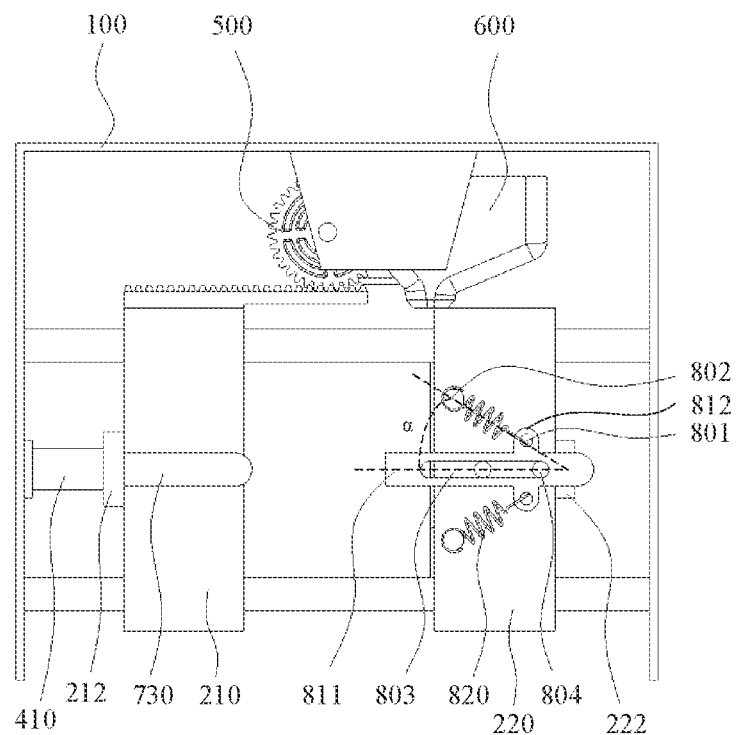
FIG. 33 is a diagram showing a structure of yet another ice maker in a separated state, in accordance with some embodiments.
Figure 34:
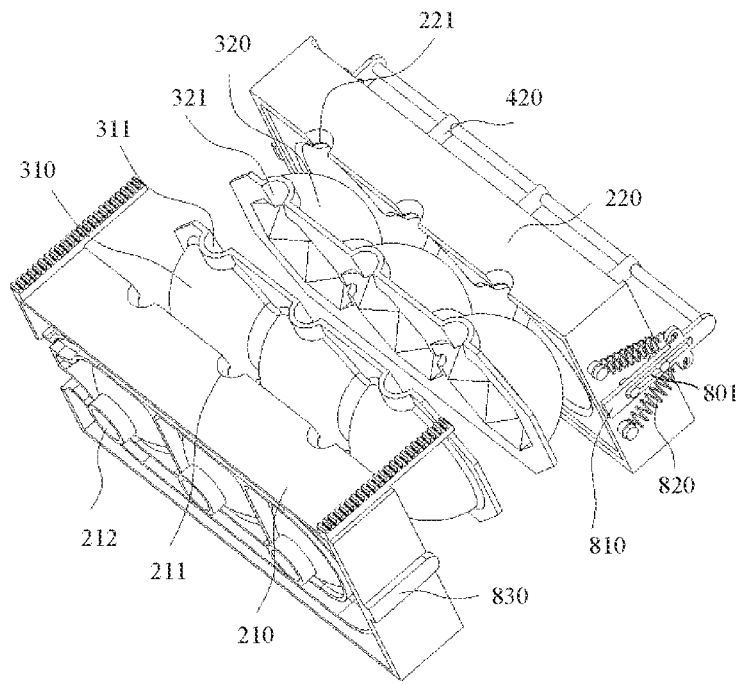
FIG. 34 is an exploded view of a shell body and a mold body of yet another ice maker, in accordance with some embodiments.
Figure 35:
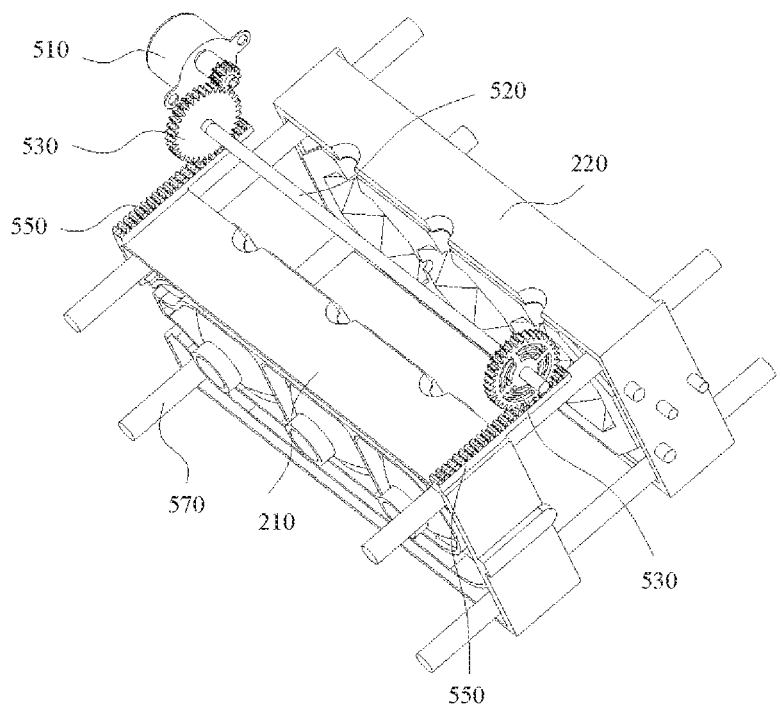
FIG. 35 is a diagram showing a structure of a driving mechanism and a shell body of yet another ice maker, in accordance with some embodiments.

FIG. 32 shows that the elastic assembly 800 is in the stretched state, and in this case, the first shell portion 210 and the second shell portion 220 are in the closed state. FIG. 33 shows that the elastic assembly 800 is in the reset state, and in this case, the first shell portion 210 and the second shell portion 220 are in the separated state. In a case where the first shell portion 210 and the second shell portion 220 are in the closed state, the first shell portion 210 applies a force to the elastic assembly 800, thus the elastic assembly 800 is in the stretched state. In the stretched state, the second push rod 420 is away from the second shell portion 220.

Upon demolding, the driving mechanism 500 drives the first shell portion 210 to move to the predetermined position, the first push rod 410 passes through the first through hole 212 to push against the first mold portion 310, and thus the first mold portion 310 is deformed due to stress, so that the ice cube in the first mold portion 310 is demolded. In a process when the driving mechanism 500 drives the first shell portion 210 to move to the predetermined position, as the first shell portion 210 moves, the first shell portion 210 moves away from the elastic assembly 800, so that the force applied to the elastic assembly 800 by the first shell portion 210 decreases. As a result, the elastic assembly 800 is reset due to an action of a restoring force, and the second push rod 420 passes through the second through hole 222 to push against the second mold portion 320, so that the second shell portion 320 is deformed due to stress, and the ice cube in the second mold portion is demolded.

In this way, by means of the first shell portion 210 (including the first mold portion 310) and the elastic assembly 800 driving the movement of the second push rod 420, the ice cube may be pushed out in a relatively short movement stroke to achieve demolding, which is beneficial to reduce the space occupied by the ice maker 1001. Referring to FIGS. 32 to 35, in a case where the first shell portion 210 adopts a translational opening-closing movement, the elastic assembly 800 includes a second connecting rod 810, a spring 820, and a blocking portion 830.

In some embodiments, the ice maker 1001 includes one group or two groups of elastic assemblies 800. Each group of elastic assemblies 800 includes one or two springs 820. The two springs 820 are connected with the second connecting rod 810 and are located on two sides (e.g., the upper side or the lower side) of the second connecting rod 810 in the extending direction thereof.

For ease of description, the following will be described by considering an example in which one group of elastic assemblies 800 and one second connecting rod 810 are located on a same side of the ice maker 1001.

As shown in FIG. 33, the extending direction of the second connecting rod 810 is substantially the same as the movement direction of the first shell portion 210. For example, the second connecting rod 810 may be set as a strip-shaped and plate-like structure. The second connecting rod 810 includes a second connecting rod body 811, two connecting portions 812 arranged symmetrically with respect to an extending direction of the second connecting rod body 811, and a mounting hole 801 penetrating the connecting portion 812 in the thickness direction thereof, and an end of the spring 820 is connected with the mounting hole 801. A protrusion 802 is provided on a side surface of the second shell portion 220 proximate to the second connecting rod 810. The protrusion 802 is provided in a one-to-one correspondence with the mounting hole 801, and the other end of the spring 820 is connected with the protrusion 802.

In some embodiments, the protrusion 802 is disposed adjacent to the first shell portion 210. As shown in FIG. 33, with the side surface of the second shell portion 220 as a projection surface, there is an included angle α of a predetermined angle between a connecting line of centers of the protrusion 802 and the mounting hole 801 and a straight line where the second connecting rod body 811 is located.

The second connecting rod 810 further includes a second strip-shaped hole 803 penetrating the second connecting rod body in a thickness thereof. The extending direction of the second strip-shaped hole 803 is substantively the same as the movement direction of the first shell portion 210. Two limiting protruding portions 804 are provided on the side surface of the second shell portion 220. A length of the second strip-shaped hole 803 is greater than a distance between the two limiting protruding portions 804, and the second strip-shaped hole 803 may cooperate with the two limiting protruding portions 804 to limit a translation distance of the second connecting rod 810.

An end of the second connecting rod 810 away from the first shell portion 210 is connected with the second push rod 420. The blocking portion 830 is disposed at a position of the first shell portion 210 corresponding to the second connecting rod 810 and is configured to abut against an end of the second connecting rod 810 proximate to the first shell portion 210 in a case where the first shell portion 210 and the second shell portion 220 are in a closed state, so that the spring 820 is in the stretched state.

When the driving mechanism 500 drives the first shell portion 210 away from the second shell portion 220, the blocking portion 830 moves along with the first shell portion 210 and releases the end of the second connecting rod 810 proximate to the first shell portion 210, so that the elastic assembly 800 is in the reset state.

The above structure takes advantage of stretching and resetting properties of the spring 820. In a case where the spring 820 is in a stretching state, the elastic assembly 800 urges the second push rod 420 to be away from the second mold portion 320. In a case where the spring 820 is in a reset state, the elastic assembly 800 urges the second push rod 420 to push out the ice cube in the second mold portion 320, and the first push rod 410 passes through the first through hole 212 to push against the first mold portion 310, so that the first mold portion 310 is deformed due to stress, and the ice cube in the first mold portion 310 is thus demolded. The above structure for demolding the ice cube is simple, has a high demolding efficiency, is not prone to failure, and is easy to operate.

Figure 39:
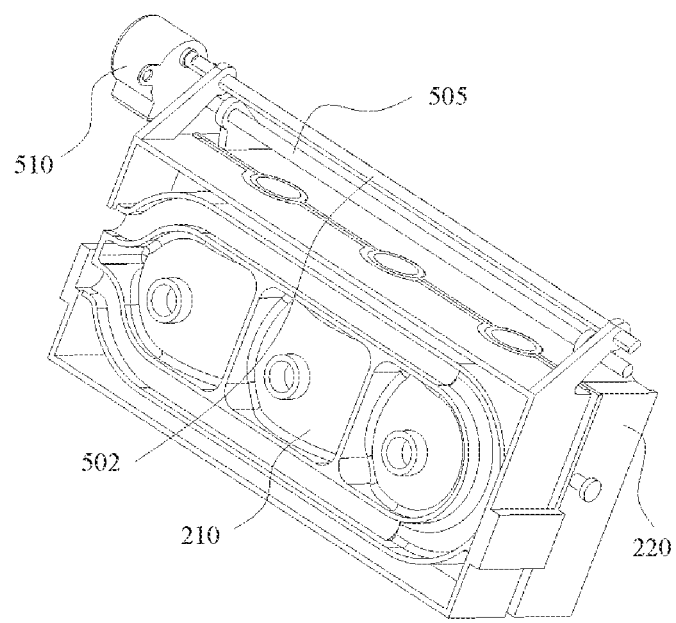
FIG. 39 is a diagram showing a structure of a driving mechanism and a shell body of yet another ice maker, in accordance with some embodiments.

Referring to FIG. 39, in a case where the first shell portion 210 adopts a rotational opening-closing movement, the driving mechanism 500 includes a motor 510 and a first rotating shaft 502. The first shell portion 210 is connected with the first rotating shaft 502, so that the first shell portion 210 moves synchronously with the first rotating shaft 502. The motor 510 is connected with the first rotating shaft 502, so that the motor 510 may drive the first rotating shaft 502 to rotate, and the first shell portion 210 may rotate in a predetermined direction through the rotation of the first rotating shaft 502.

Referring to FIGS. 36 to 39, in a case where the first shell portion 210 adopts a rotational opening-closing movement, the elastic assembly 800 includes a second connecting rod 810, a spring 820, and a blocking portion 830. The second connecting rod 810 in FIGS. 36 to 38 includes a first rod portion 8101 and a second rod portion 8102 that are connected with each other. An extending direction of the first rod portion 8101 is substantially the same as the movement direction of the first shell portion 210. For example, the first rod portion 8101 is formed as a plate-like structure. An extending direction of the second rod portion 8102 is substantially perpendicular to the movement direction of the first shell portion 210. For example, the second rod portion 8102 is formed as a plate-like structure. In a case where the ice maker 1001 is provided with the fixing shaft 505, an end of the second rod portion 8102 proximate to the first rotating shaft 502 is rotatably connected with the fixing shaft 505, and an end of the second rod portion 8102 away from the first rotating shaft 502 is in fixed connection to an end of the first rod portion 8101 away from the first shell portion 210. The second rod portion 8102 is provided with a mounting hole 801. For example, the mounting hole 801 is disposed in a substantially central portion of the second rod portion 8102. An end of the spring 820 is connected with the mounting hole 801. The protrusion 802 is provided on a side surface of the second shell portion 220 opposite to the second connecting rod 810. For example, the protrusion 802 is disposed on a substantially central portion of the side surface of the second shell portion 220. The other end of the spring 820 is connected with the protrusion 802.

Figure 36:
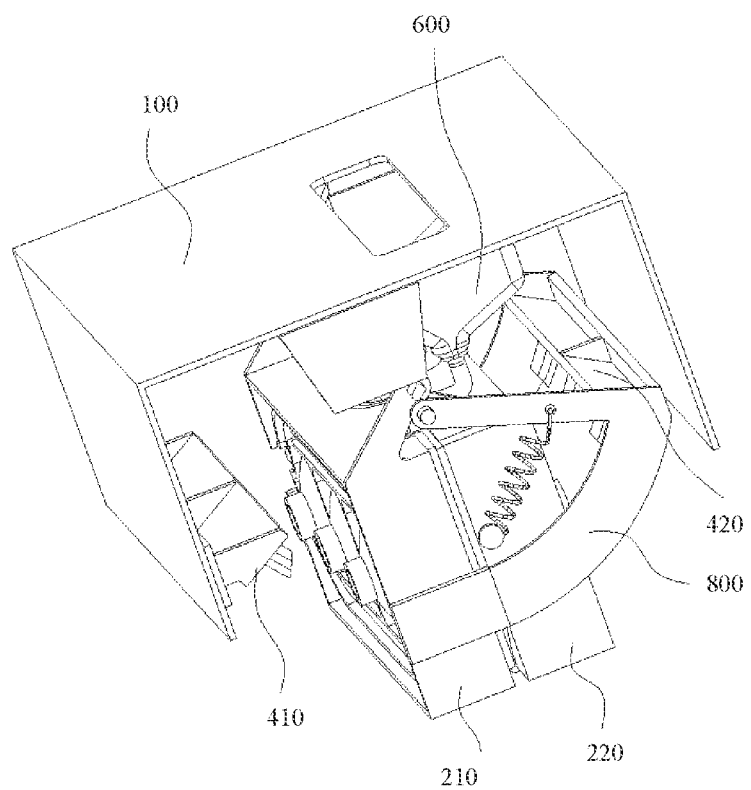
FIG. 36 is a diagram showing a structure of yet another ice maker, in accordance with some embodiments.
Figure 37:
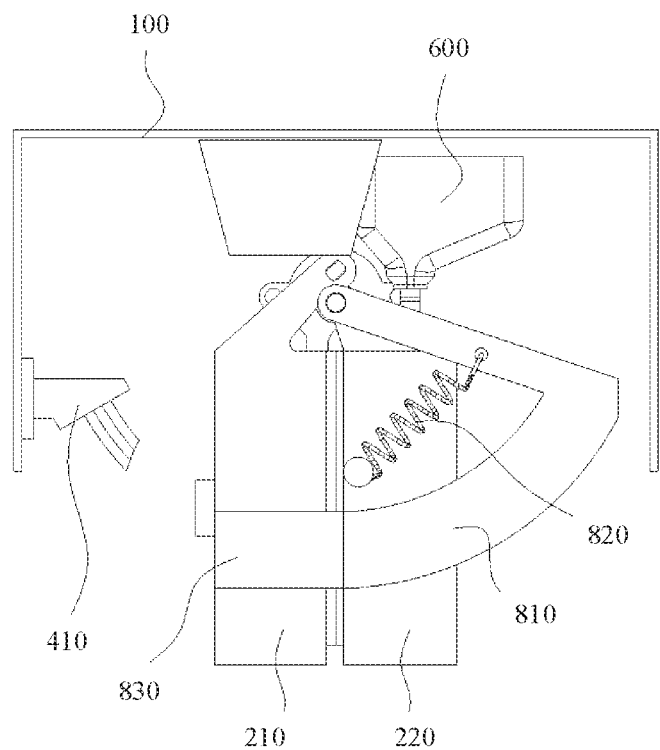
FIG. 37 is a diagram showing a structure of yet another ice maker in a closed state, in accordance with some embodiments.
Figure 38:
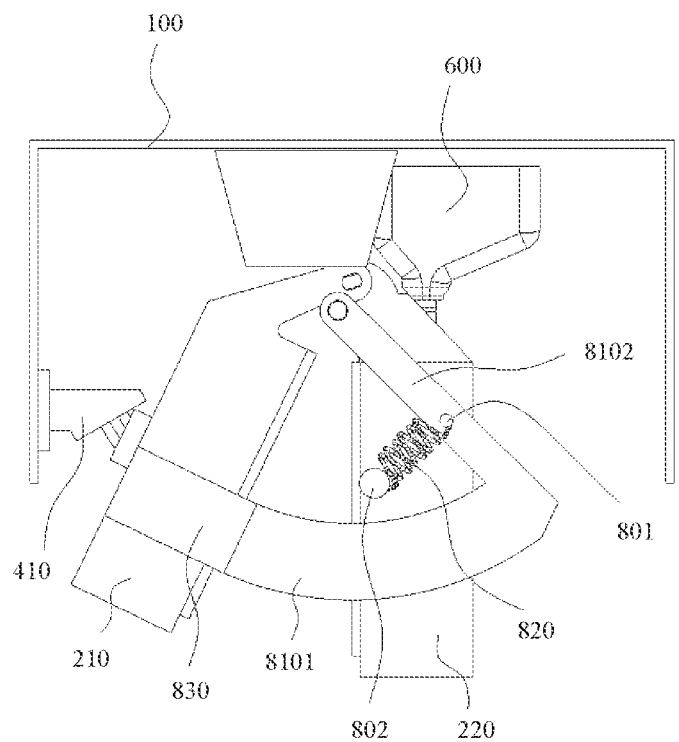
FIG. 38 is a diagram showing a structure of yet another ice maker in a separated state, in accordance with some embodiments.

As shown in FIGS. 36 and 38, the end of the first rod portion 8101 away from the first shell portion 210 is also connected with the second push rod 420. The blocking portion 830 is disposed at a position of the first shell portion 210 corresponding to the first rod portion 8101, and is configured to abut against an end of the first rod portion 8101 proximate to the first shell portion 210 in a case where the first shell portion 210 and the second shell portion 220 are in a closed state, so that the spring 820 is in the stretched state.

Figure 40:
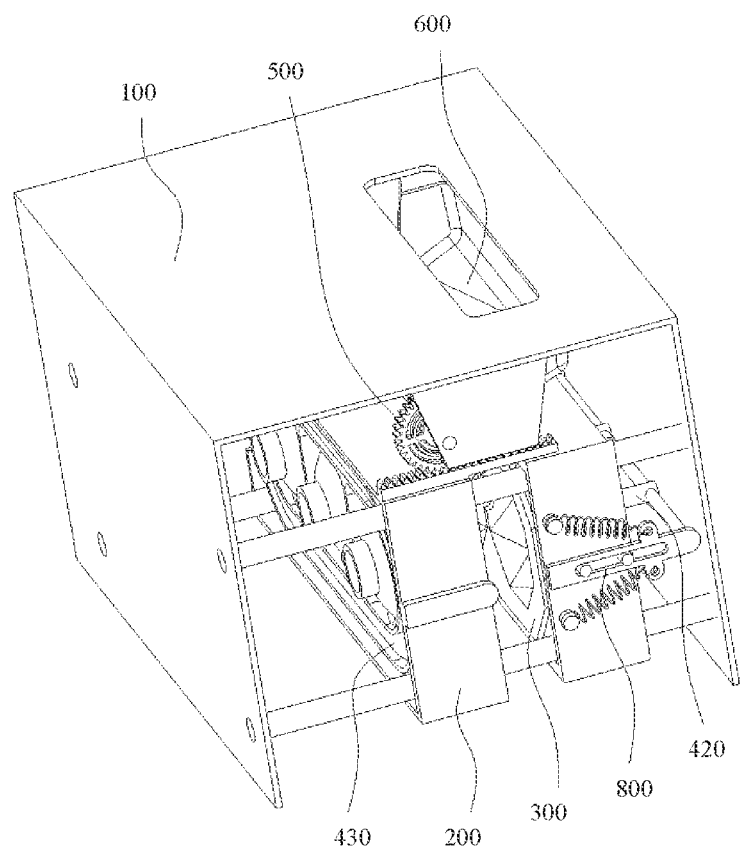
FIG. 40 is a diagram showing a structure of yet another ice maker, in accordance with some embodiments.
Figure 41:
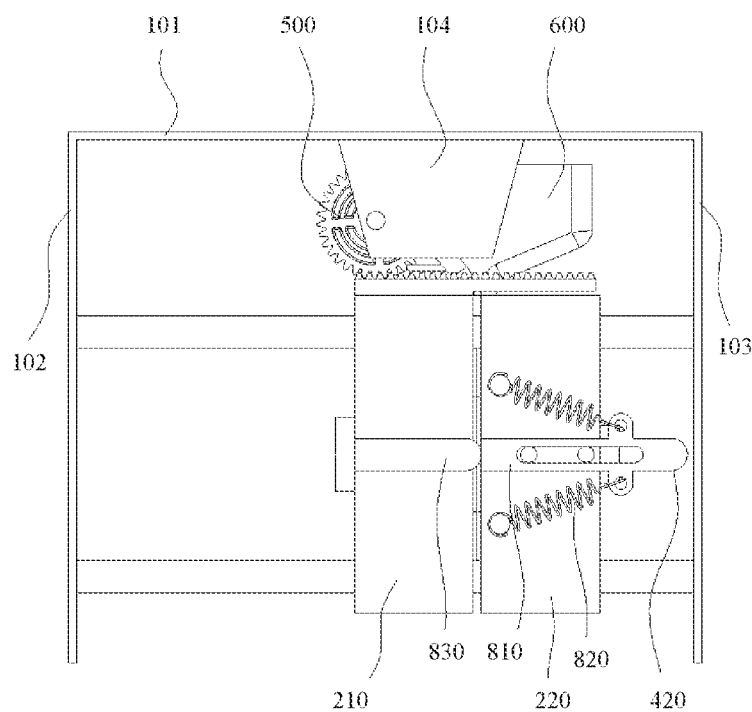
FIG. 41 is a diagram showing a structure of yet another ice maker in a closed state, in accordance with some embodiments.
Figure 42:
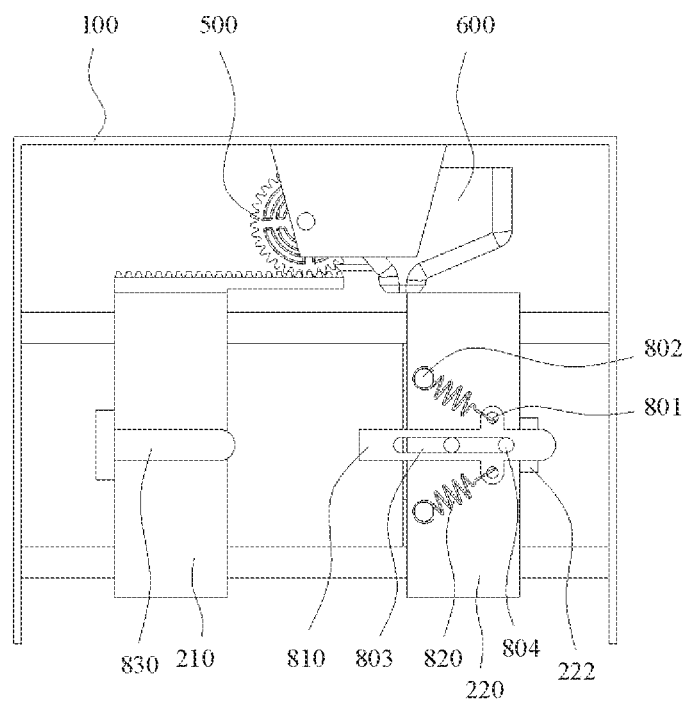
FIG. 42 is a diagram showing a structure of yet another ice maker in a separated state, in accordance with some embodiments.
Figure 43:
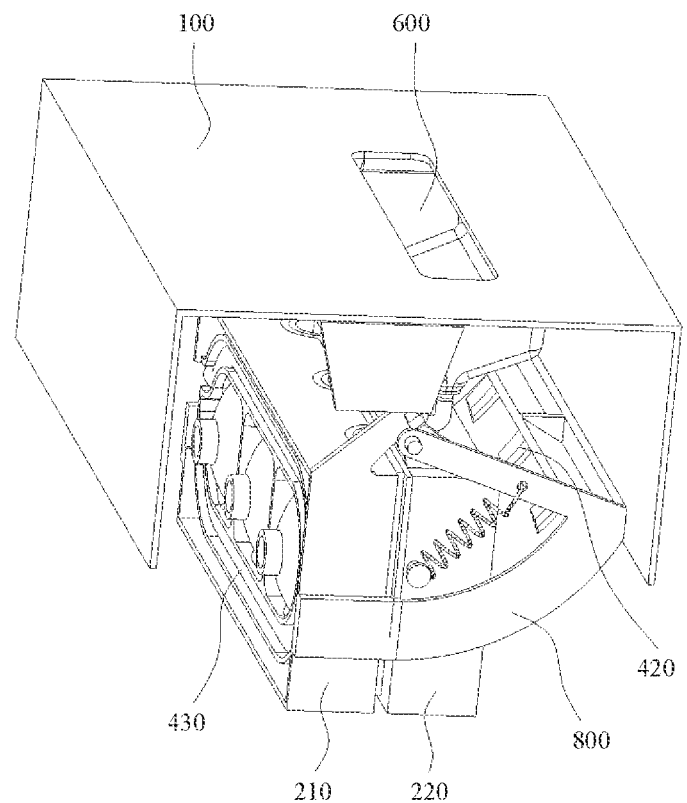
FIG. 43 is a diagram showing a structure of yet another ice maker, in accordance with some embodiments.
Figure 44:
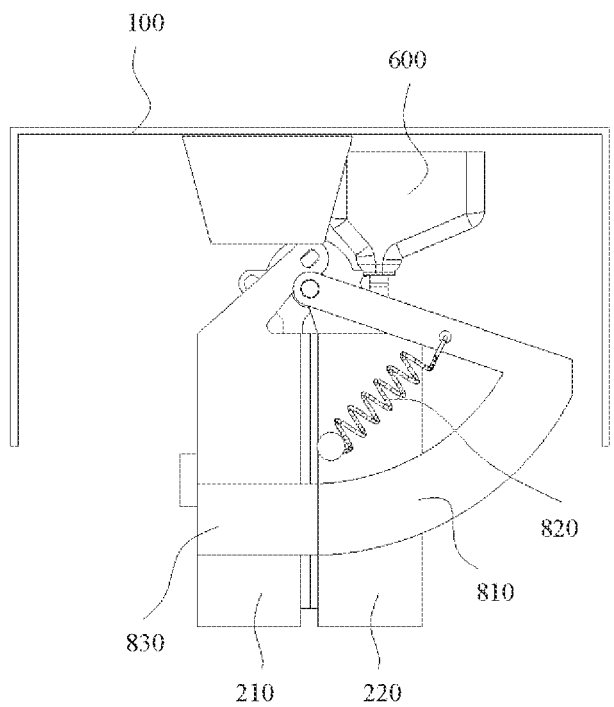
FIG. 44 is a diagram showing a structure of yet another ice maker in a closed state, in accordance with some embodiments.
Figure 45:
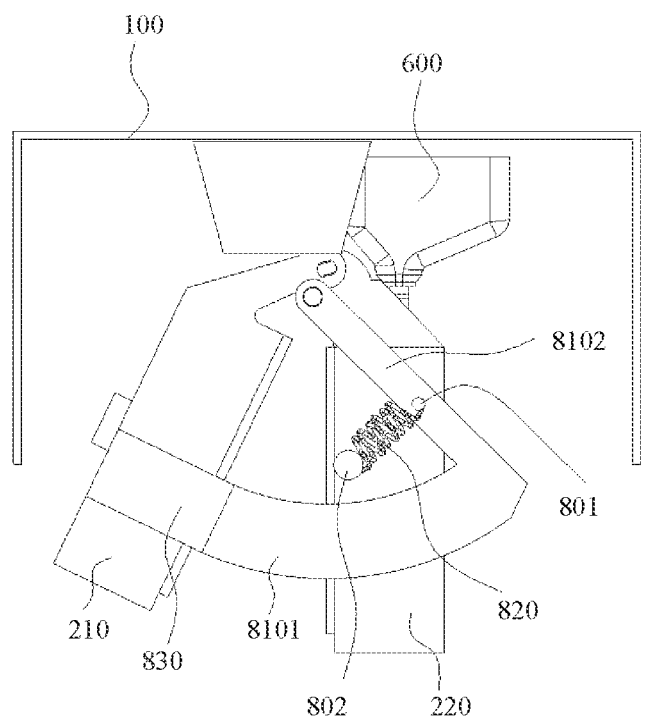
FIG. 45 is a diagram showing a structure of yet another ice maker in a separated state, in accordance with some embodiments.

In some embodiments, the ice maker 1001 is not provided with the first push rod 410. As shown in FIGS. 40 to 45, the ice maker 1001 further includes a first heating mechanism 430. The first heating mechanism 430 is disposed on a side of the first shell portion 210 away from the second shell portion 220. A main difference between FIGS. 40 and 31, and FIGS. 43 and 36 is that the demolding of the first sub-mold shell 401 in FIGS. 40 and 43 is realized by melting the outer wall of the ice cube through the first heating mechanism 430, rather than by forcing the first mold portion 310 to be deformed due to stress by pushing the first push rod 410 against the first mold portion 310 through the first through hole 212.

Figure 46:
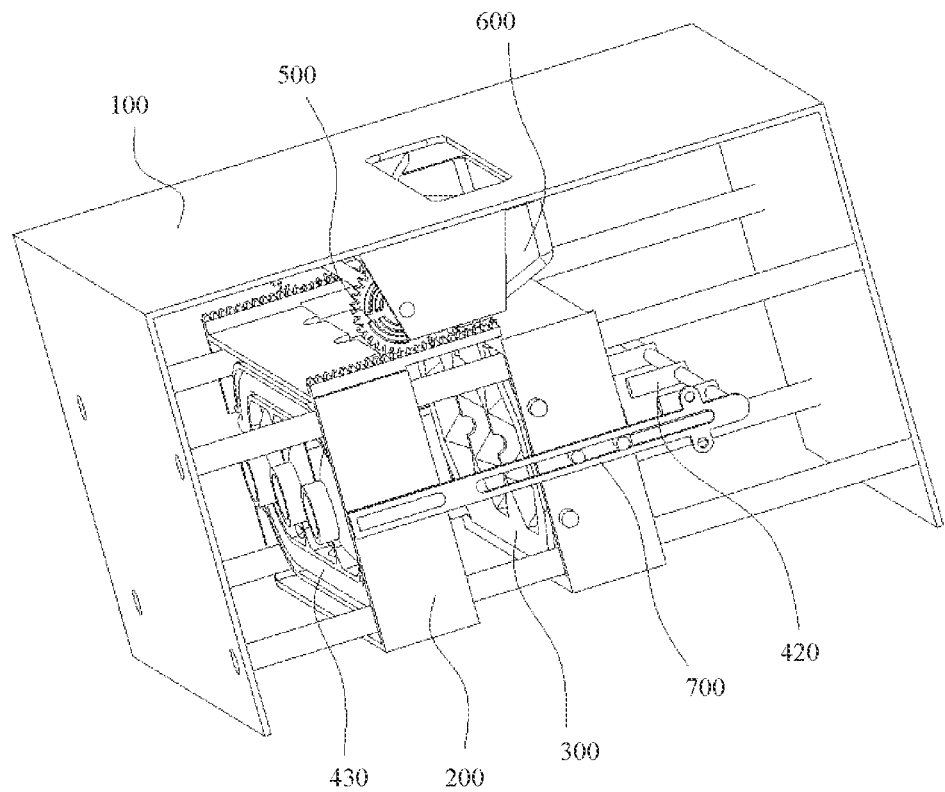
FIG. 46 is a diagram showing a structure of yet another ice maker, in accordance with some embodiments.
Figure 47:
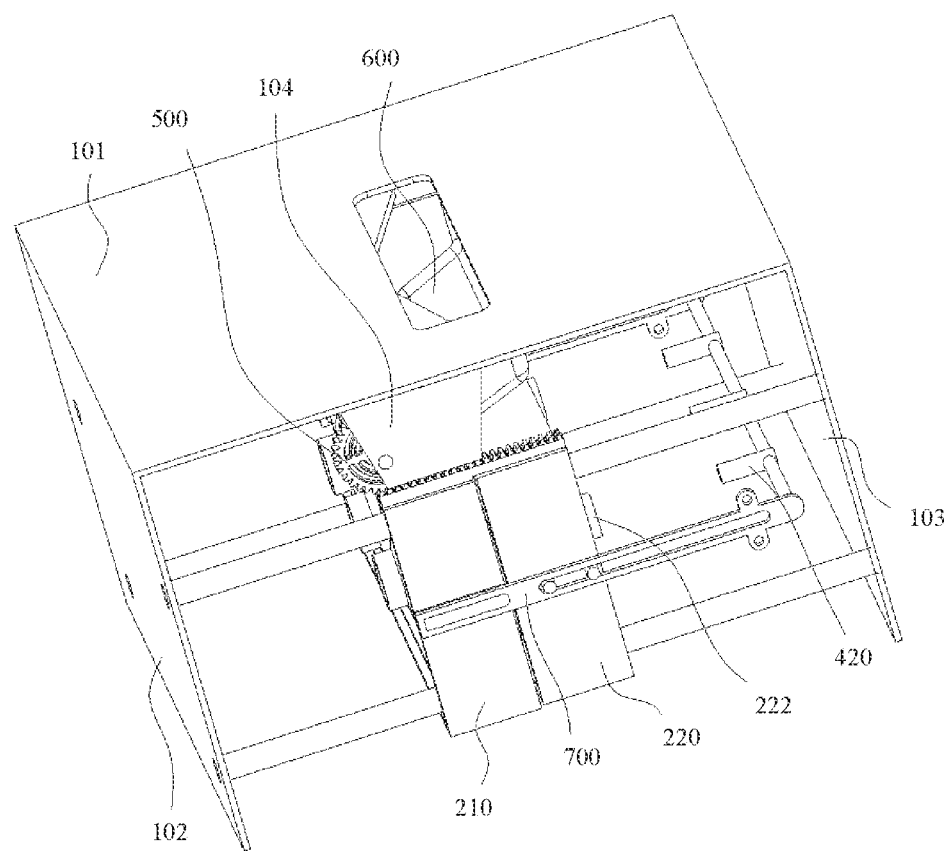
FIG. 47 is a diagram showing a structure of yet another ice maker in a closed state, in accordance with some embodiments.
Figure 48:
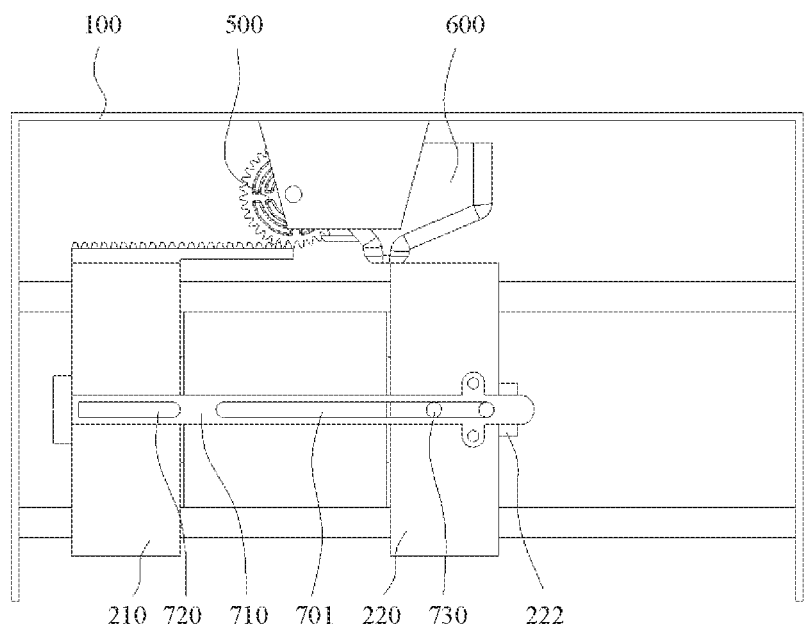
FIG. 48 is a diagram showing a structure of yet another ice maker in a separated state, in accordance with some embodiments.
Figure 49:
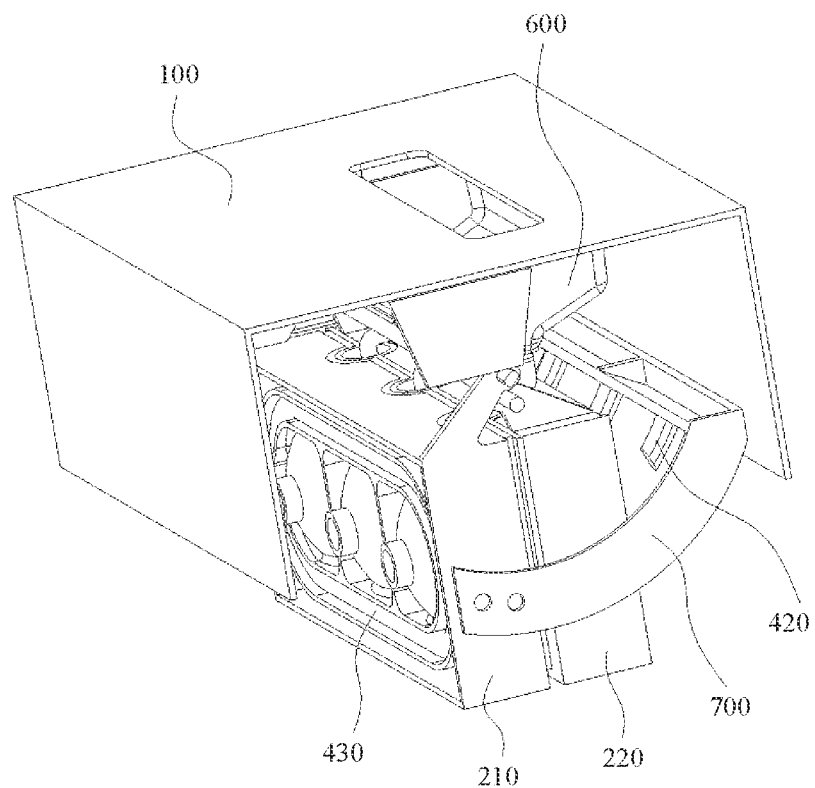
FIG. 49 is a diagram showing a structure of yet another ice maker, in accordance with some embodiments.
Figure 50:
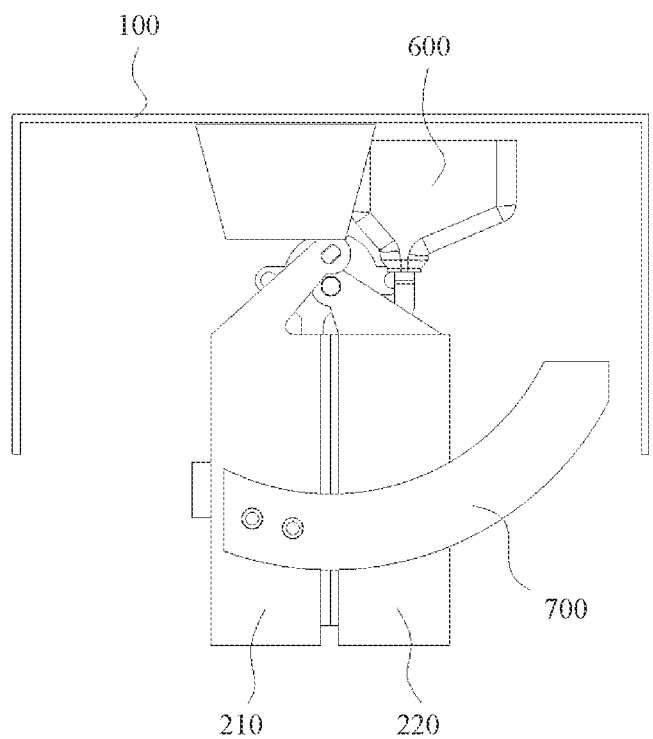
FIG. 50 is a diagram showing a structure of yet another ice maker in a closed state, in accordance with some embodiments.
Figure 51:
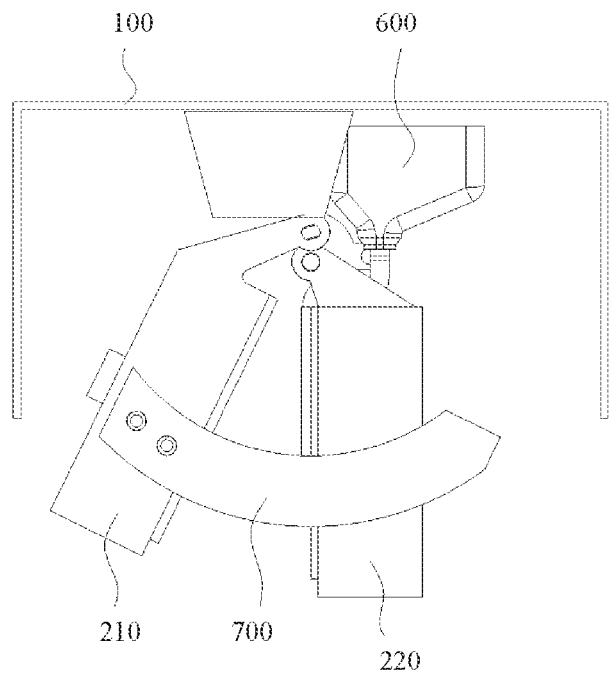
FIG. 51 is a diagram showing a structure of yet another ice maker in a separated state, in accordance with some embodiments.
Figure 52:
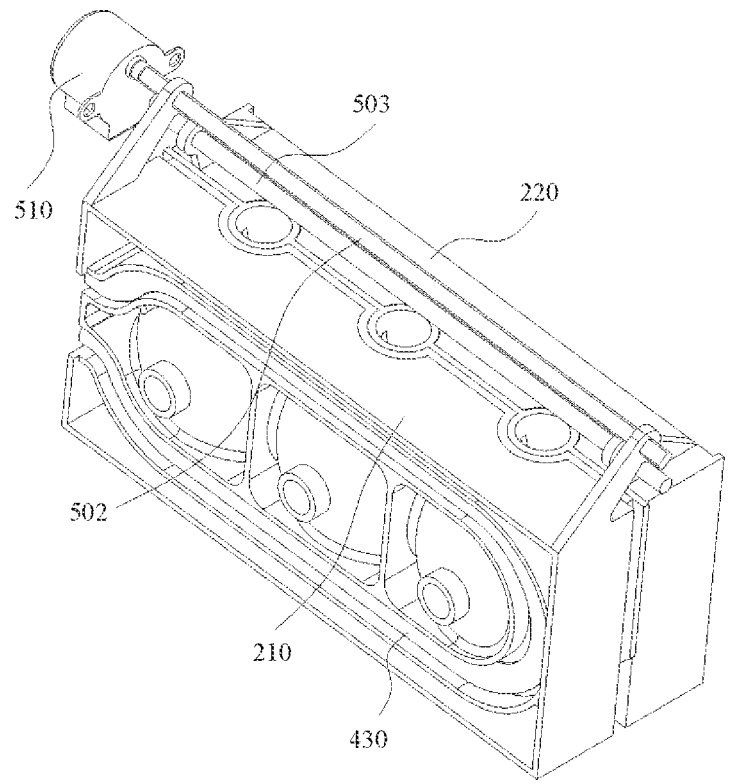
FIG. 52 is a diagram showing a structure of a driving mechanism and a shell body of yet another ice maker, in accordance with some embodiments.

Similarly, as shown in FIGS. 46 to 52, the ice maker 1001 further includes a first heating mechanism 430. A main difference between FIGS. 46 and 22, and FIGS. 49 and 27 is that, the demolding of the first sub-mold shell 401 in FIGS. 46 and 49 is realized by melting the outer wall of the ice cube through the first heating mechanism 430, rather than by forcing the first mold portion 310 to be deformed due to stress by pushing the first push rod 410 against the first mold portion 310 through the first through hole 212.

Figure 53:
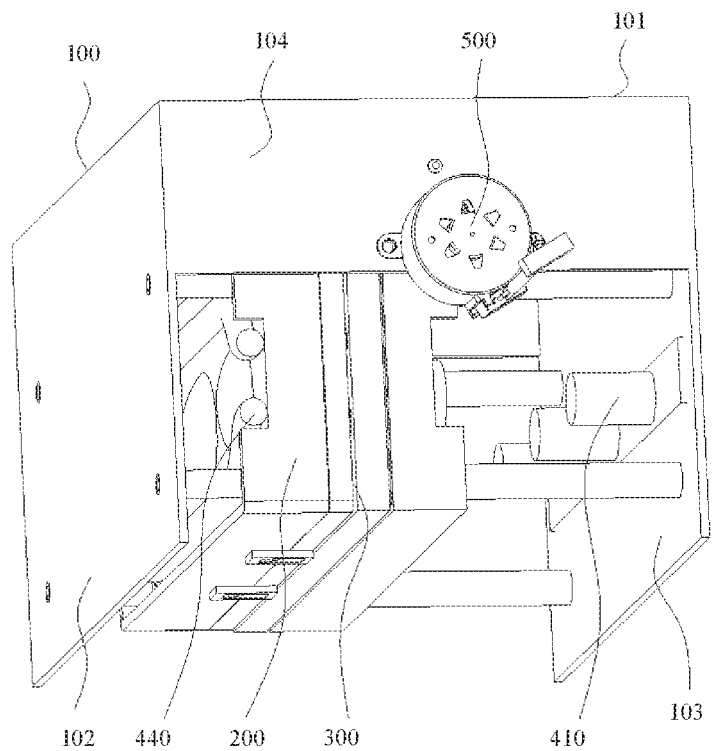
FIG. 53 is a diagram showing a structure of yet another ice maker, in accordance with some embodiments.
Figure 54:
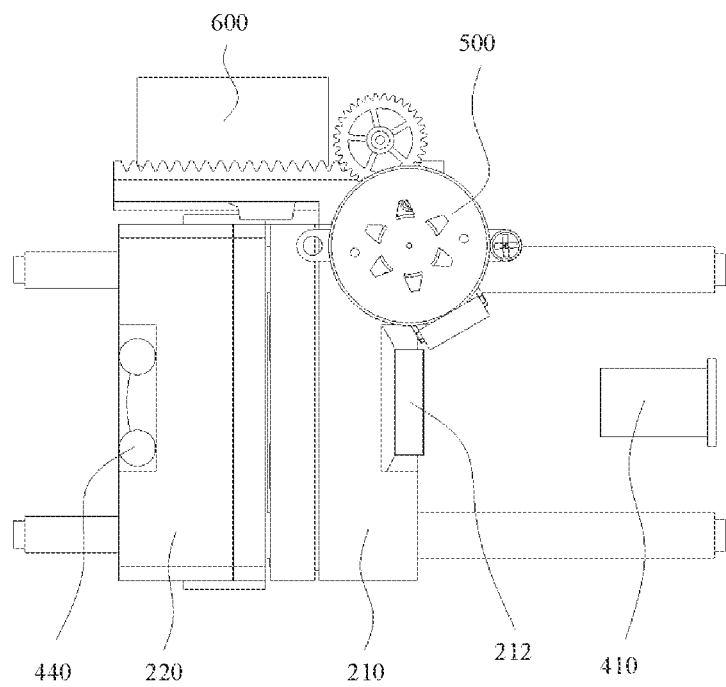
FIG. 54 is a diagram showing a structure of yet another ice maker in a closed state, in accordance with some embodiments.
Figure 55:
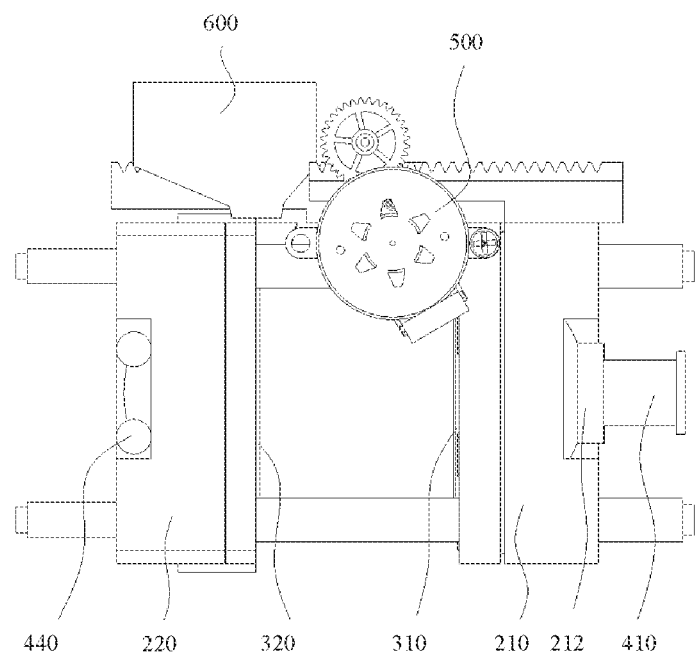
FIG. 55 is a diagram showing a structure of yet another ice maker in a separated state, in accordance with some embodiments.
Figure 56:
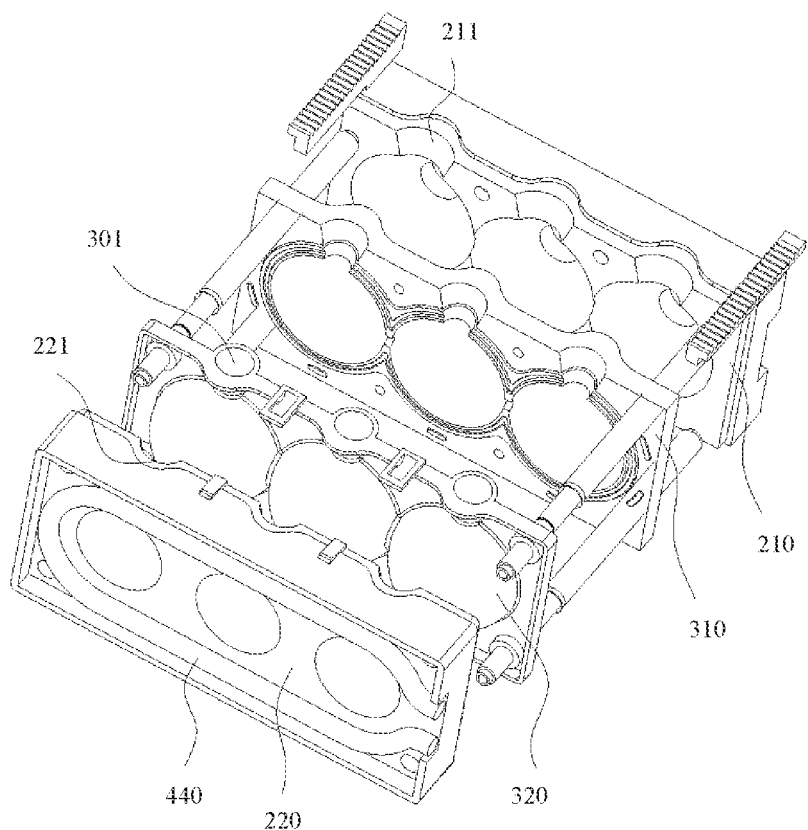
FIG. 56 is an exploded view of a shell body and a mold body of yet another ice maker, in accordance with some embodiments.
Figure 57:
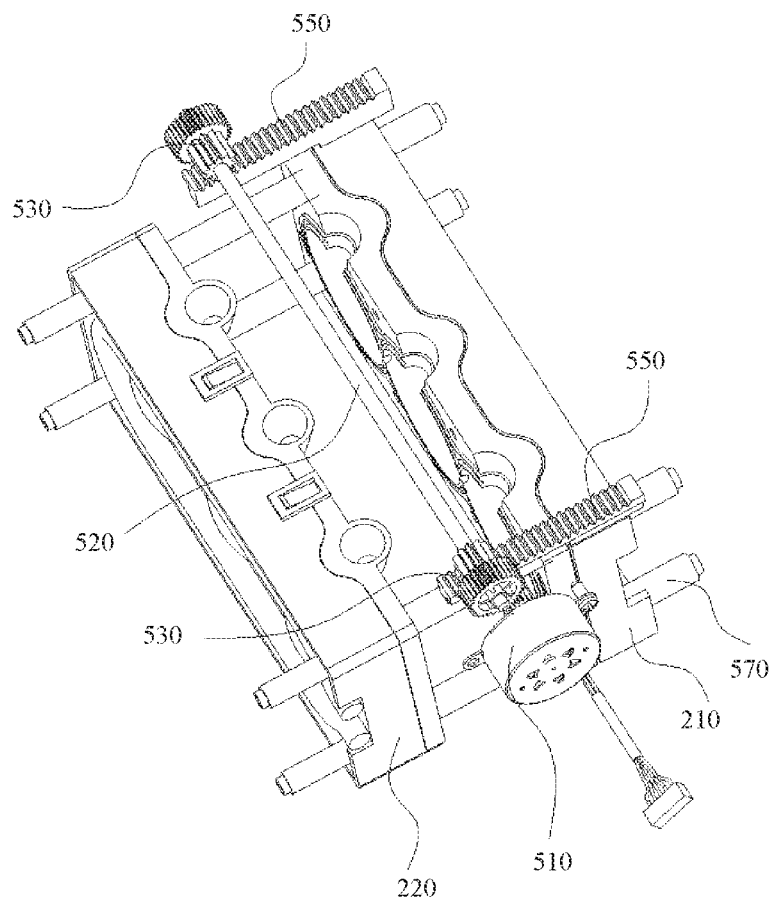
FIG. 57 is a diagram showing a structure of a driving mechanism and a shell body of yet another ice maker, in accordance with some embodiments.
Figure 58:
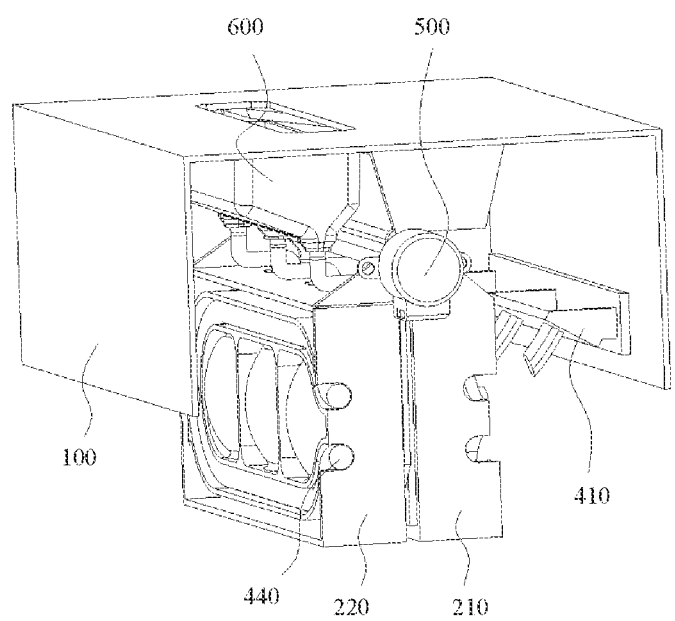
FIG. 58 is a diagram showing a structure of yet another ice maker, in accordance with some embodiments.
Figure 59:
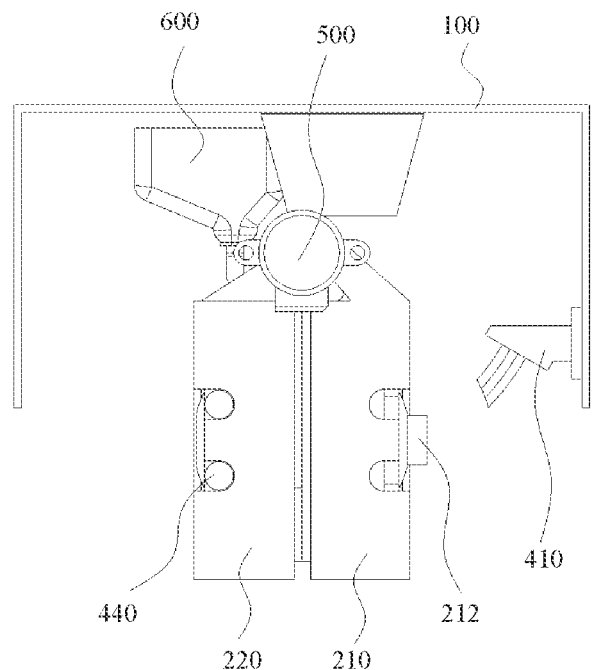
FIG. 59 is a diagram showing a structure of yet another ice maker in a closed state, in accordance with some embodiments.
Figure 60:
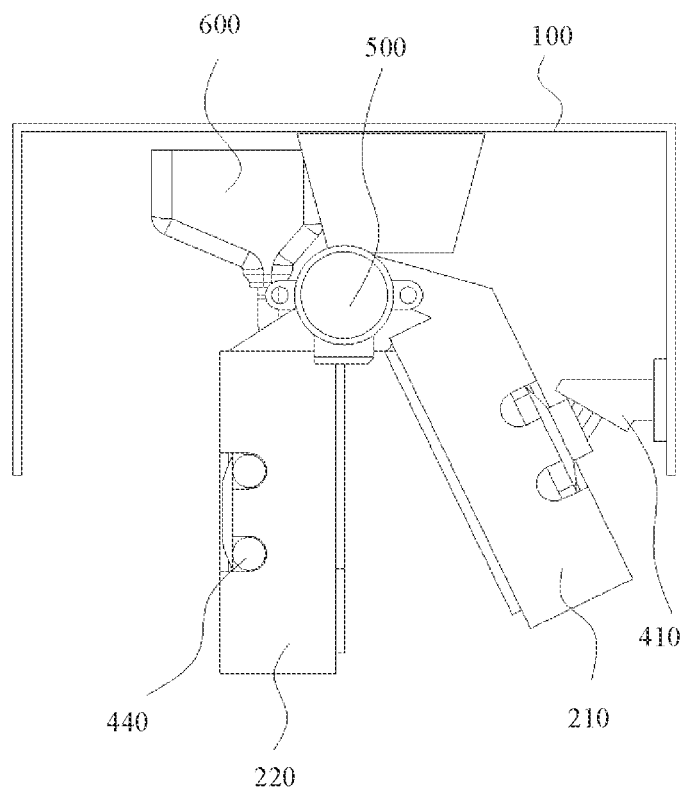
FIG. 60 is a diagram showing a structure of yet another ice maker in a separated state, in accordance with some embodiments.
Figure 61:
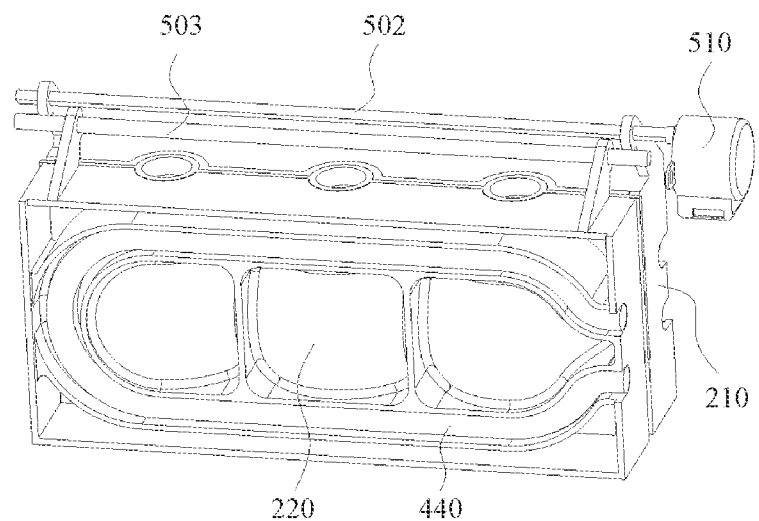
FIG. 61 is a diagram showing a structure of a driving mechanism and a shell body of yet another ice maker, in accordance with some embodiments.

In some embodiments, the ice maker 1001 is not provided with the second push rod 420. As shown in FIGS. 53 to 61, the ice maker 1001 further includes a second heating mechanism 440. The second heating mechanism 440 is disposed on the side of the second shell portion 220 away from the first shell portion 210. A main difference between FIGS. 53 and 22, and FIGS. 58 and 27 is that, the demolding of the second sub-mold shell 402 in FIGS. 53 and 58 is realized by melting the outer wall of the ice cube through the second heating mechanism 440, rather than by forcing the second mold portion 320 to be deformed due to stress by pushing the second push rod 420 against the second mold portion 320 through the second through hole 222.

Figure 62:
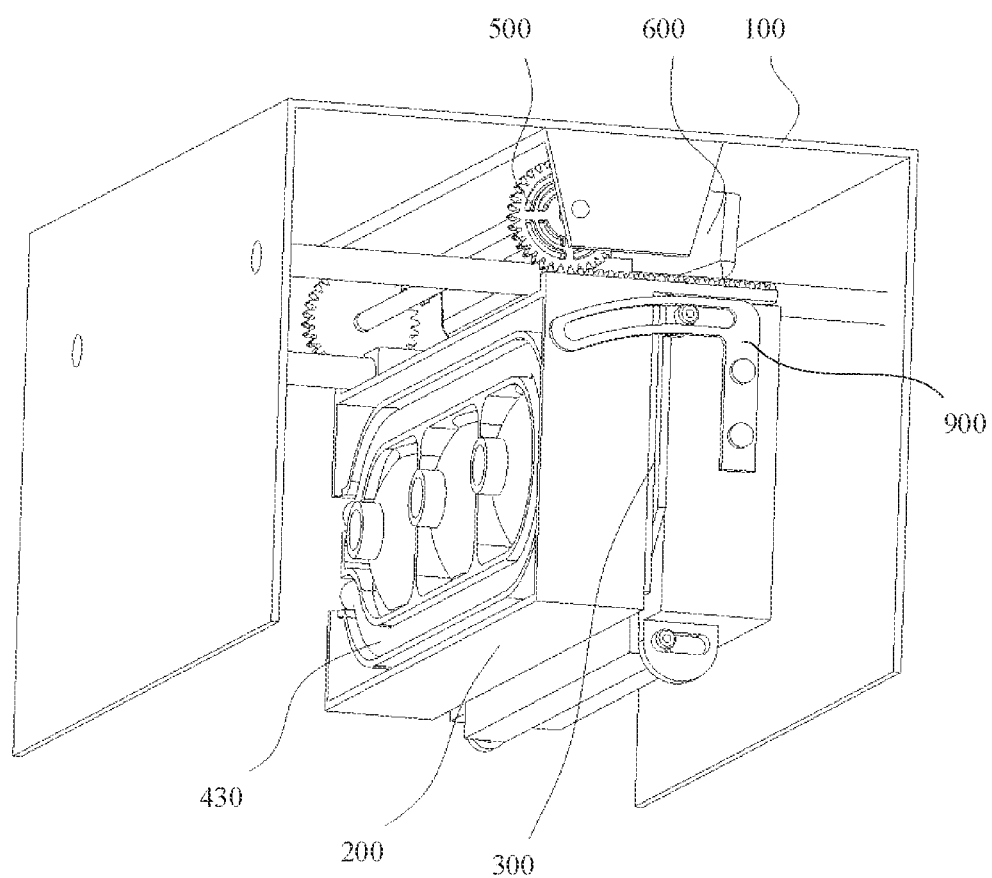
FIG. 62 is a perspective view of yet another ice maker in a closed state, in accordance with some embodiments.
Figure 63:
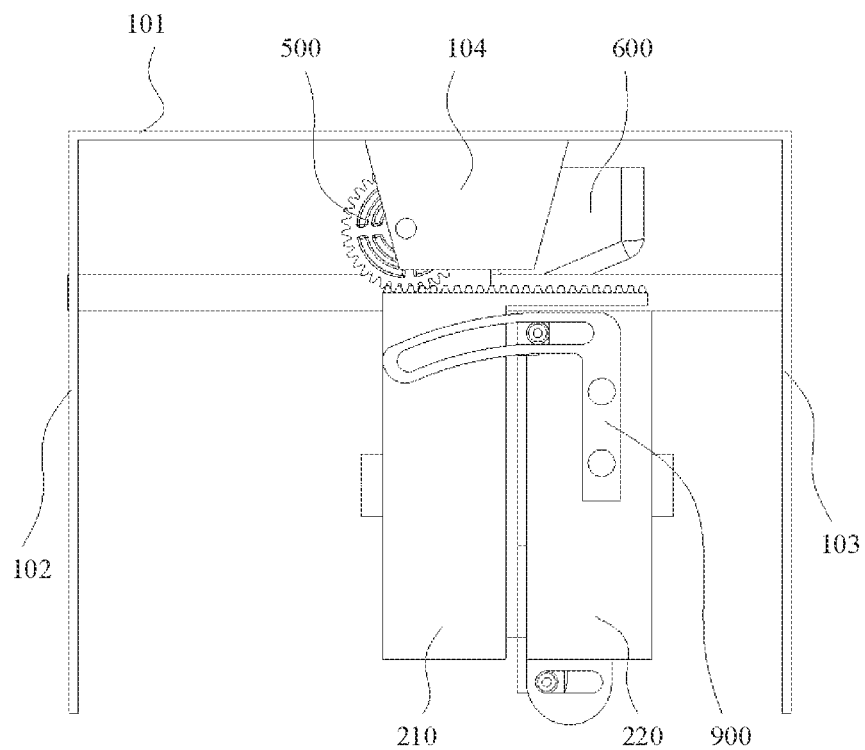
FIG. 63 is a diagram showing a structure of a side of a guide rod of yet another ice maker in a closed state, in accordance with some embodiments.
Figure 64:
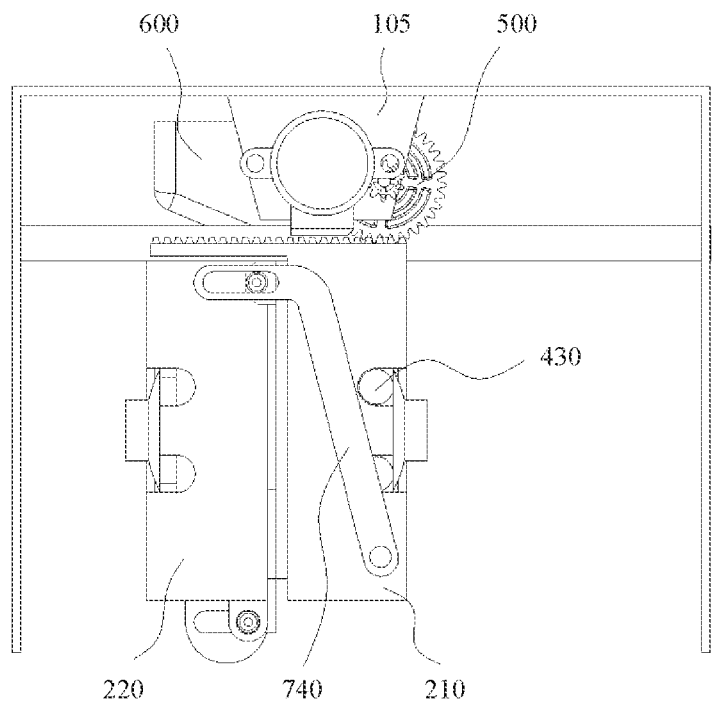
FIG. 64 is a diagram showing a structure of a side of a third connecting rod of yet another ice maker in a closed state, in accordance with some embodiments.

In some embodiments, as shown in FIGS. 62 to 64, the connecting rod assembly 700 includes a third connecting rod 740. The second mold portion 320 is rotatably connected with the second shell portion 220, and the second mold portion 320 is rotatably connected with the first shell portion 210 through the third connecting rod 740. In a case where the first shell portion 210 and the second shell portion 220 are in the separated state, the second mold portion 320 is turned downwards to realize the demolding by rotating the second mold portion 320 with respect to the second shell portion 220. A main difference between FIG. 65 and FIG. 46 is that the demolding of the second sub-mold shell 402 is mainly realized by separating the ice cube from the second mold portion 320 by turning the second mold portion 320 downwards, rather than by forcing the second mold portion 320 to be deformed due to stress by pushing the second push rod 420 against the second mold portion 320 through the second through hole 222.

Upon demolding, the first heating mechanism 430 is started up first, the outer wall of the ice cube proximate to the first mold portion 310 is melted, so as to realize the demolding of the ice cube in the first mold portion 310, and the outer wall of the ice cube proximate to the second mold portion 320 is adhered to the second mold portion 320. The driving mechanism 500 then drives the first shell portion 210 to move to the predetermined position, and the second mold portion 320 may be turned downwards through the movement of the first shell portion 210, so that the ice cube in the second mold portion 320 falls into the ice storage box due to gravity for access by the user.

Figure 65:
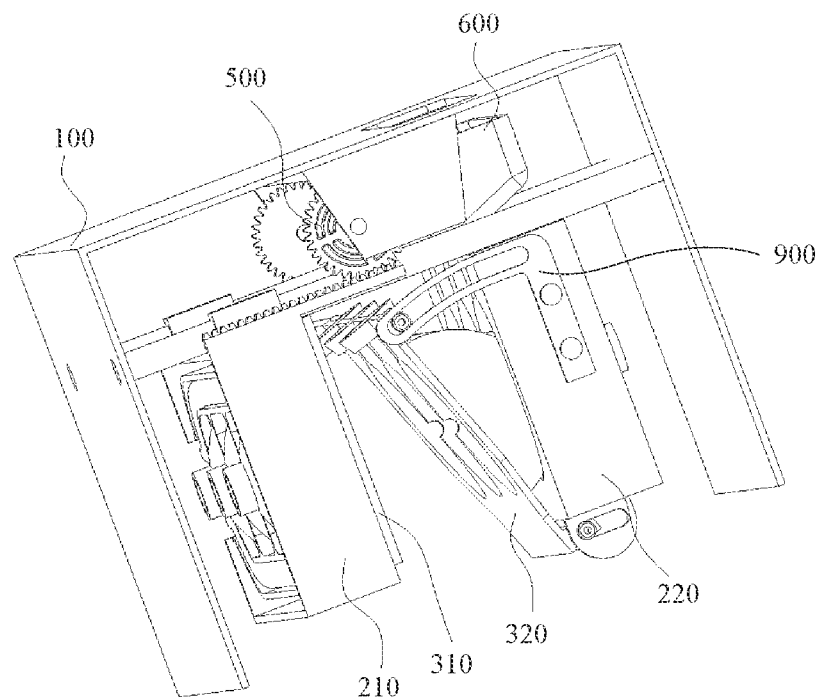
FIG. 65 is a perspective view of yet another ice maker in a separated state, in accordance with some embodiments.
Figure 66:
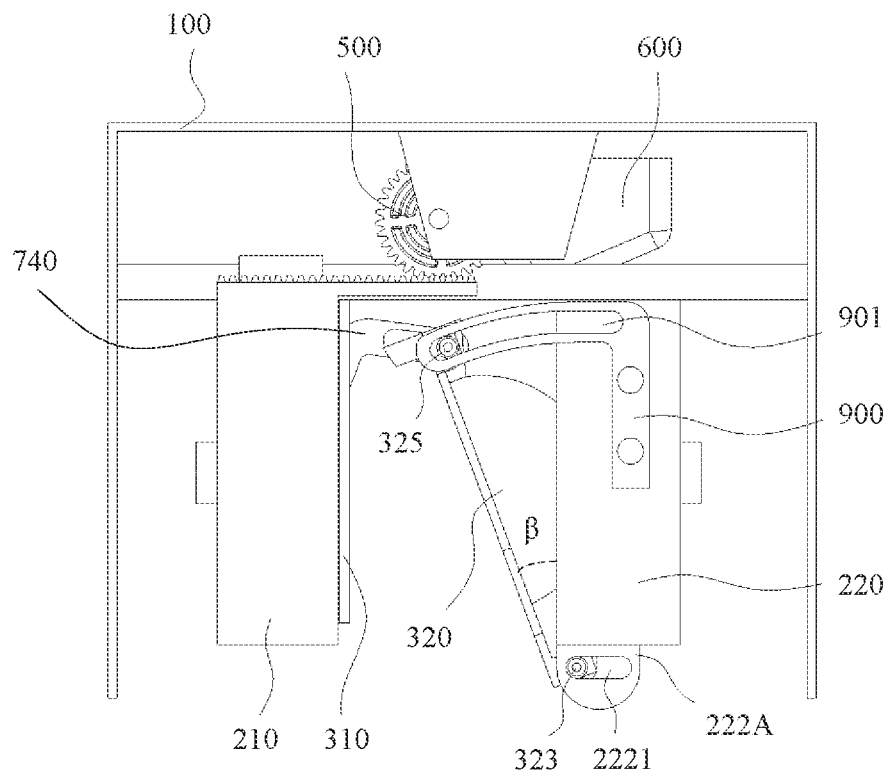
FIG. 66 is a diagram showing a structure of a side of a guide rod of yet another ice maker in a separated state, in accordance with some embodiments.
Figure 67:
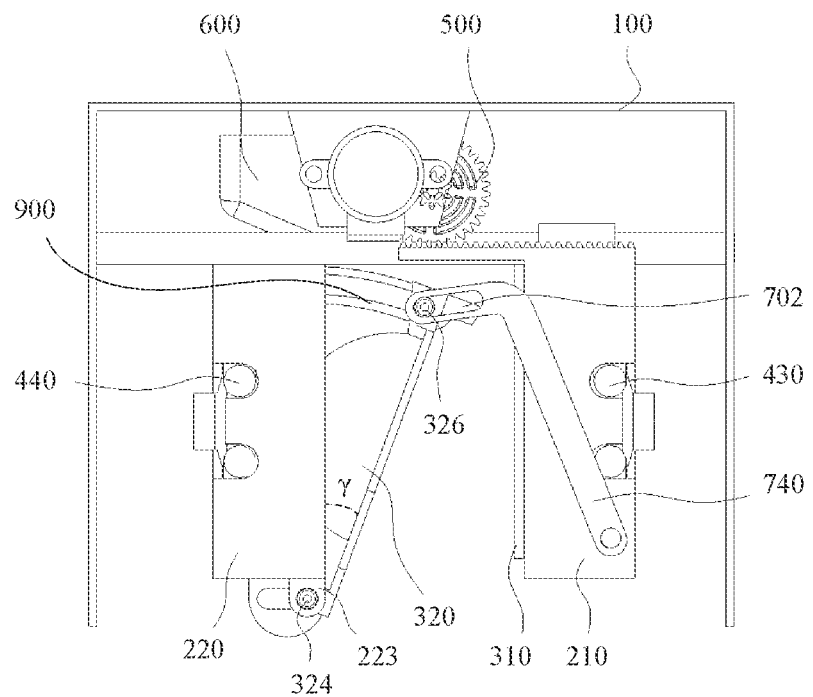
FIG. 67 is a diagram showing a structure of a side of a third connecting rod of yet another ice maker in a separated state, in accordance with some embodiments.

As shown in FIGS. 63 to 65, the bottom portion of the second mold portion 320 is rotatably connected with the bottom portion of the second shell portion 220. As shown in FIGS. 66 and 67, a first shaft portion 323 and a second shaft portion are provided on two sides of the bottom portion of the second mold portion 320, and a first bearing 222A and a second bearing 223 are correspondingly provided on two sides of the bottom portion of the second shell portion 220. The first shaft portion 323 is rotatably connected with the first bearing 222A, and the second shaft portion 324 is rotatably connected with the second bearing 223. The first bearing 222A is provided with a corresponding fifth strip-shaped hole 2221, through which the first shaft portion 323 is rotatably connected with the first bearing 222A, so that the first shaft portion 323 may translate along the fifth strip-shaped hole 2221.

Figure 68:
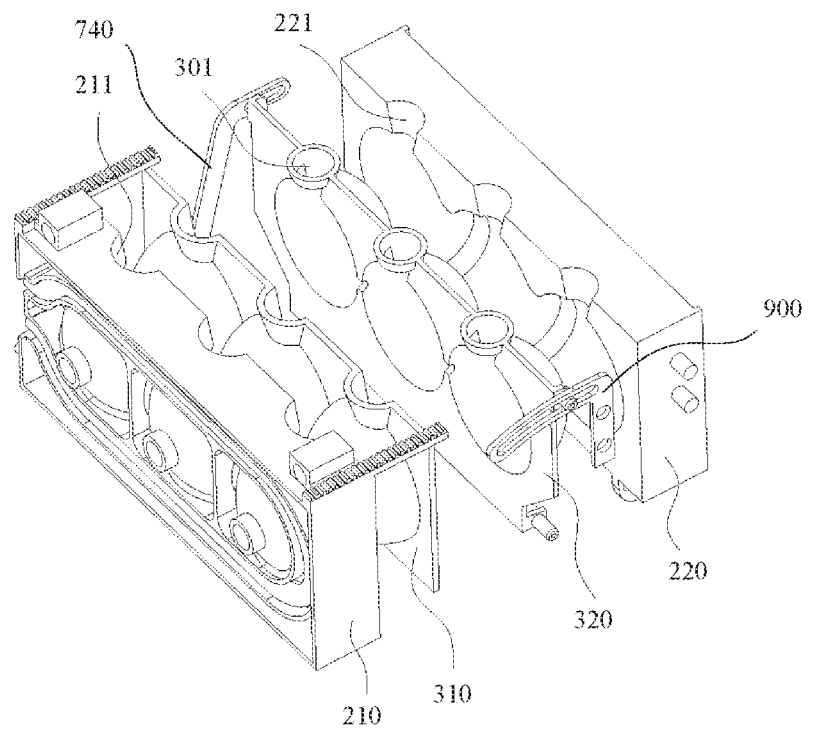
FIG. 68 is an exploded view of a shell body and mold body of yet another ice maker, in accordance with some embodiments.
Figure 69:
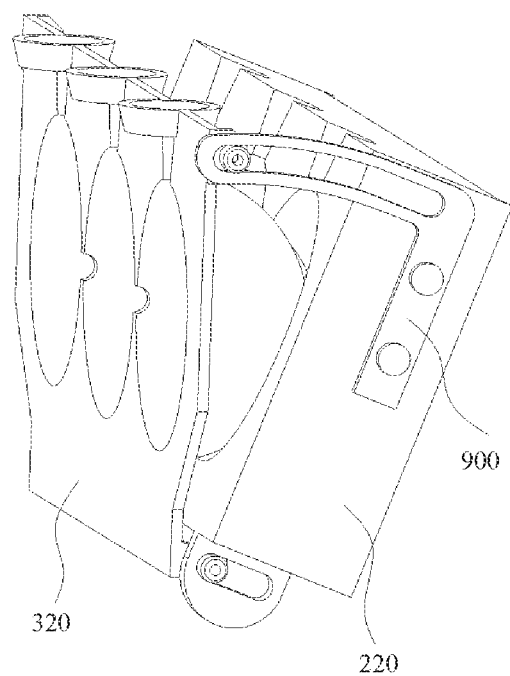
FIG. 69 is a diagram showing a structure of a second shell portion and a second mold portion of yet another ice maker, in accordance with some embodiments.
Figure 70:
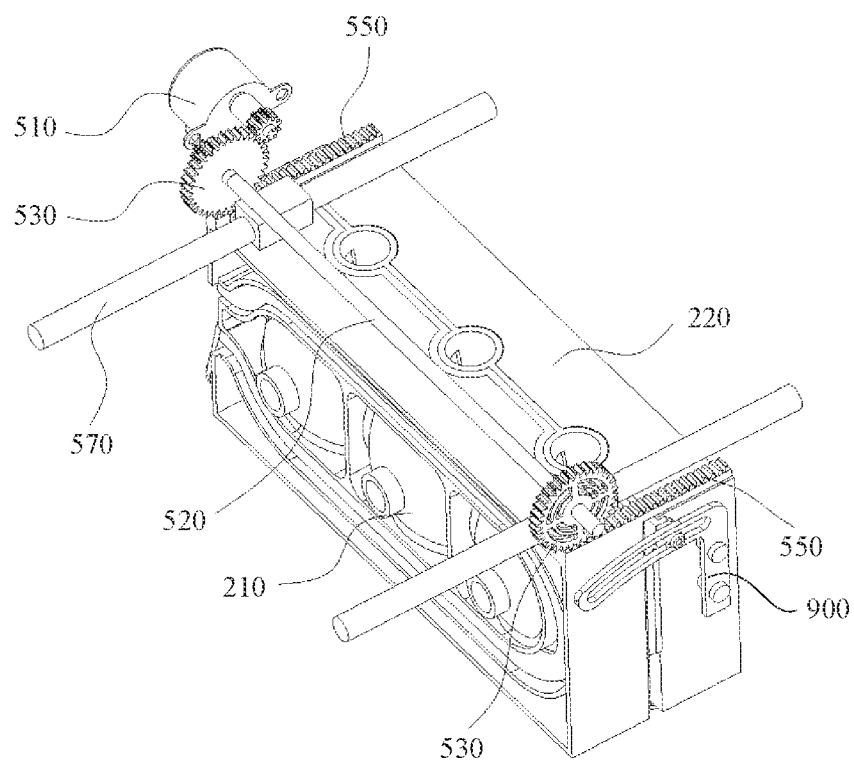
FIG. 70 is a diagram showing a structure of a driving mechanism and a shell body of yet another ice maker, in accordance with some embodiments.

As shown in FIGS. 68 to 70, the ice maker 1001 further includes a guide rod 900. The top portion of the second shell portion 220 is rotatably connected with the top portion of the second mold portion 320 through the guide rod 900. A first limiting column 325 and a second limiting column 326 are provided on two sides of the top portion of the second mold portion 320 in the movement direction of the first shell portion 210. The guide rod 900 and the third connecting rod 740 are located on two sides of the mold shell, one of the guide rod 900 and the third connecting rod 740 is disposed on a side of the first shell portion 210 in the movement direction of the first shell portion 210, and the other of the guide rod 900 and the third connecting rod 740 is disposed on another side of the second shell portion 220 in the movement direction of the first shell portion 210.

As shown in FIG. 66, the guide rod 900 is provided with a third strip-shaped hole 901 that is arc-shaped, the first limiting column 325 is disposed in the third strip-shaped hole 901, so as to limit the turning angle of the second mold portion 320. As the first shell portion 210 moves, a maximum turning angle of the second mold portion 320 under limitation of the guide rod 900 is a first inclination angle $\beta$.

As shown in FIG. 67, the third connecting rod 740 is provided with a fourth strip-shaped hole 702, the second limiting column 326 is clamped in the fourth strip-shaped hole 702, and the third connecting rod 740 is mainly configured to drive the second mold portion 320 to turn through the guide rod 900 and limit the turning angle of the second mold portion 320.

As shown in FIG. 67, as the first shell portion 210 moves, a maximum turning angle of the second mold portion 320 under the driving of the third connecting rod 740 is a second inclination angle $\gamma$. In a case where an absolute value of the difference between the first inclination angle $\beta$ and the second inclination angle $\gamma$ is greater than 0 (the absolute value of the difference value is generally between 10° to 15°), the second mold portion 320 is twisted and deformed, so that the ice cube in the second mold portion 320 may be demolded.

In some embodiments, the ice maker 1001 only includes one heating mechanism. Referring to FIG. 64, only the first shell portion 210 is provided with a first heating mechanism 430.

In some embodiments, the ice maker 1001 includes two heating mechanisms. Referring to FIG. 67, the first shell portion 210 is provided with a first heating mechanism 430, and the second shell portion 220 is provided with a second heating mechanism 440. The second heating mechanism 440 is configured to start heating before the second mold portion 320 is turned, so that the outer wall of the ice cube proximate to the second shell portion 220 is melted, thus the ice cube is demolded more quickly when the second mold portion 320 is turned downwards.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A refrigerator, comprising:
   a refrigerator body, the refrigerator body defining an ice making compartment therein; and
   an ice maker, the ice maker being disposed in the ice making compartment, and the ice maker including:
      a mold shell, the mold shell having a water inlet, the mold shell including a first sub-mold shell and a second sub-mold shell, at least one of the first sub-mold shell and the second sub-mold shell being movable, the first sub-mold shell and the second sub-mold shell being configured to be switchable between a separated state and a closed state, in the separated state, the first sub-mold shell and the second sub-mold shell being away from each other; in the closed state, the first sub-mold shell and the second sub-mold shell moving toward each other until they are closed;
      a driving mechanism, the driving mechanism being configured to drive the first sub-mold shell and the second sub-mold shell to switch between the separated state and the closed state;
      a first push rod, the first push rod being located on a side of the first sub-mold shell away from the second sub-mold shell; and
      a second push rod, the second push rod being located on a side of the second sub-mold shell away from the first sub-mold shell;
   wherein at least one of the first push rod or the second push rod is fixed; the first push rod is configured to push against the first sub-mold shell when the first sub-mold shell moves to a first predetermined position; and the second push rod is configured to push against the second sub-mold shell when the second sub-mold shell moves to a second predetermined position;
   wherein the driving mechanism is configured to drive the first sub-mold shell or the second sub-mold shell to rotate; or
   the driving mechanism is configured to drive the first sub-mold shell or the second sub-mold shell to move;
   wherein the driving mechanism includes:
      a motor;
      a first gear set, the first gear set being drivingly connected with the motor;
      a main rotating shaft, the main rotating shaft being connected with the first gear set, so as to drive the main rotating shaft to rotate through the first gear set;
      a first rack, the first rack being drivingly connected with the first gear set, the first rack being disposed on a side of a top portion of the second sub-mold shell in a movement direction thereof;
      a second gear set, the second gear set being drivingly connected with the first rack;
      a second rack, the second rack being drivingly connected with the second gear set, the second rack being disposed on a side of a middle portion of the first sub-mold shell in a movement direction; and
      a slide rod, the slide rod being inserted through at least one of the first sub-mold shell or the second sub-mold shell, so that the at least one of the first sub-mold shell or the second sub-mold shell moves along the slide rod;
   or,
   the driving mechanism includes:
      a first rotating shaft, the first rotating shaft being connected with the first sub-mold shell;
      a second rotating shaft, the second rotating shaft being connected with the second sub-mold shell;
      a motor, the motor being connected with the first rotating shaft or the second rotating shaft, so as to drive the first rotating shaft or the second rotating shaft to rotate; and
      four third sub-gears, two third sub-gears of the four third sub-gears being disposed on two ends of the first rotating shaft, and another two third sub-gears of the four third sub-gears being disposed on two ends of the second rotating shaft, two third sub-gears located on a same end of the first rotating shaft and the second rotating shaft are drivingly connected with each other.

2. The refrigerator according to claim 1, wherein the first sub-mold shell includes:
   a first shell portion, a first through hole matched with the first push rod being provided on a side of the first shell portion away from the second sub-mold shell; and
   a first mold portion, the first mold portion being disposed in the first shell portion, the first push rod being configured to push against the first mold portion through the first through hole; and
   the second sub-mold shell includes:
   a second shell portion, a second through hole matched with the second push rod being provided on a side of the second shell portion away from the first sub-mold shell, and
   a second mold portion, the second mold portion being disposed in the second shell portion, and the second push rod being configured to push against the second mold portion through the second through hole.

3. The refrigerator according to claim 2, wherein
   a side surface of the first push rod adjacent to the first mold portion is configured to be matched with a contour surface of a first concave cavity of the first mold portion; and
   a side surface of the second push rod adjacent to the second mold portion is configured to be matched with a contour surface of a second concave cavity of the second mold portion.

4. The refrigerator according to claim 3, wherein a first engaging portion is provided on an edge of the first concave cavity of the first mold portion, and a second engaging portion matched with the first engaging portion is provided on an edge of the second concave cavity of the second mold portion.

5. The refrigerator according to claim 4, wherein one of the first engaging portion and the second engaging portion includes a convex rib, and another one of the first engaging portion and the second engaging portion includes a groove.

6. The refrigerator according to claim 2, wherein a first concave cavity is provided on a top portion of the first mold portion, a second concave cavity is provided on a top portion of the second mold portion, and in the closed state, the first concave cavity and the second concave cavity are enclosed to provide the water inlet.

7. The refrigerator according to claim 2, wherein the water inlet is configured as a closed hole, the water inlet and the first mold portion are configured as a one-piece member, or the water inlet and the second mold portion are configured as a one-piece member.

8. The refrigerator according to claim 2, wherein a first groove is provided on a side of the first shell portion proximate to the second shell portion, and a second groove is provided on a side of the second shell portion proximate to the first shell portion, and in the closed state, the first groove and the second groove are closed to provide an avoidance opening that encloses an outer circumference of the water inlet.

9. The refrigerator according to claim 1, wherein
the first rack includes:
  a first upper teeth portion, the first upper teeth portion being drivingly connected with the first gear set; or,
the first rack includes:
  a first upper teeth portion, the first upper teeth portion being drivingly connected with the first gear set; and
  a first lower teeth portion, the first lower teeth portion extending in a same direction as the first upper teeth portion, and being drivingly connected with the second gear set;
the second rack includes:
  a second upper teeth portion, the second upper teeth portion being drivingly connected with the first lower teeth portion through the second gear set.

10. The refrigerator according to claim 1, wherein
the first sub-mold shell is movable;
the ice maker further includes:
a first connecting rod, the first connecting rod including a first connecting rod body, a fixing hole penetrating the first connecting rod body in a thickness direction thereof, and a first strip-shaped hole, the fixing hole being located on an end of the first connecting rod body, the first strip-shaped hole being closer to the second push rod than the fixing hole, the end of the first connecting rod body being connected with one of the first sub-mold shell and the second sub-mold shell that is movable, and anther end of the first connecting rod body being connected with one of the first push rod and the second push rod that is movable;
a first buckle portion, the first buckle portion being located on at least one side of the first sub-mold shell in a movement direction thereof and being configured to be matched with the fixing hole; and
a second buckle portion, the second buckle portion being located on the second sub-mold shell, the second buckle portion and the first buckle portion being located on a same side, the second buckle portion being inserted through the first strip-shaped hole, and the first connecting rod being movable with respect to the second buckle portion.

11. A refrigerator, comprising:
a refrigerator body, the refrigerator body defining an ice making compartment therein; and
an ice maker, the ice maker being disposed in the ice making compartment, and the ice maker including:
  a mold shell, the mold shell having a water inlet, the mold shell including a first sub-mold shell and a second sub-mold shell, at least one of the first sub-mold shell and the second sub-mold shell being movable, the first sub-mold shell and the second sub-mold shell being configured to be switchable between a separated state and a closed state, in the separated state, the first sub-mold shell and the second sub-mold shell being away from each other; in the closed state, the first sub-mold shell and the second sub-mold shell moving toward each other until they are closed;
  a driving mechanism, the driving mechanism being configured to drive the first sub-mold shell and the second sub-mold shell to switch between the separated state and the closed state;
  a first push rod, the first push rod being located on a side of the first sub-mold shell away from the second sub-mold shell; and
  a second push rod, the second push rod being located on a side of the second sub-mold shell away from the first sub-mold shell; wherein at least one of the first push rod or the second push rod is fixed; and
  an elastic assembly, the elastic assembly being connected with the second sub-mold shell, and the elastic assembly including a stretched state and a reset state, in the stretched state, the first sub-mold shell and the second sub-mold shell being in the closed state, in the reset state, the first sub-mold shell and the second sub-mold shell being in the separated state; the second push rod being connected with the elastic assembly and being located on a back side of the second sub-mold shell, in the stretched state, the second push rod being away from the second sub-mold shell, in the reset state, the second push rod pushing against the second sub-mold shell.

12. The refrigerator according to claim 11, wherein
the first sub-mold shell includes:
  a first shell portion and a first through hole matched with the first push rod being provided on a side of the first shell portion away from the second sub-mold shell; and
  a first mold portion, the first mold portion being disposed in the first shell portion, the first push rod being configured to push against the first mold portion through the first through hole;
the second sub-mold shell includes:
  a second shell portion and a second through hole matched with the second push rod being provided on a side of the second shell portion away from the first sub-mold shell, and
  a second mold portion, the second mold portion being disposed in the second shell portion, and the second push rod being configured to push against the second mold portion through the second through hole.

13. The refrigerator according to claim 12, wherein
a side surface of the first push rod adjacent to the first mold portion is configured to be matched with a contour surface of a first concave cavity of the first mold portion;

a side surface of the second push rod adjacent to the second mold portion is configured to be matched with a contour surface of a second concave cavity of the second mold portion; and a first engaging portion is provided on an edge of the first concave cavity of the first mold portion, and a second engaging portion matched with the first engaging portion is provided on an edge of the second concave cavity of the second mold portion;

wherein one of the first engaging portion and the second engaging portion includes a convex rib, and another one of the first engaging portion and the second engaging portion includes a groove.

14. The refrigerator according to claim 12, wherein a first concave cavity is provided on a top portion of the first mold portion, a second concave cavity is provided on a top portion of the second mold portion, and in the closed state, the first concave cavity and the second concave cavity are enclosed to provide the water inlet.

15. The refrigerator according to claim 12, wherein a first groove is provided on a side of the first shell portion proximate to the second shell portion, a second groove is provided on a side of the second shell portion proximate to the first shell portion, and in the closed state, the first groove and the second groove are closed to provide an avoidance opening that encloses an outer circumference of the water inlet.

16. The refrigerator according to claim 11, wherein the elastic assembly includes:

a second connecting rod, an end of the second connecting rod being connected with the second push rod, and an extending direction of the second connecting rod being same as a movement direction of the first sub-mold shell;

a spring, an end of the spring being connected with the second connecting rod, and another end of the spring being connected with the second sub-mold shell; and a blocking portion, the blocking portion being disposed at a position of the first sub-mold shell corresponding to the second connecting rod and being configured to abut against another end of the second connecting rod in a case where the first sub-mold shell and the second sub-mold shell are in the closed state, so that the elastic assembly is in the stretched state, and to release the another end of the second connecting rod in a case where the first sub-mold shell and the second sub-mold shell are in the separated state, so that the elastic assembly is in the reset state.

17. The refrigerator according to claim 16, wherein the ice maker includes two groups of elastic assemblies, each group of elastic assemblies includes one second connecting rod, and one or two springs;

each second connecting rod includes a second connecting rod body, two connecting portions arranged symmetrically with respect to an extending direction of the second connecting rod body, and a mounting hole penetrating each connecting portion in a thickness direction thereof, an end of the spring is connected with the mounting hole; and a protrusion is provided on a side surface of the second sub-mold shell proximate to the second connecting rod, the protrusion is disposed in one-to-one correspondence with the mounting hole, and another end of the spring is connected with the protrusion.

18. The refrigerator according to claim 11, wherein the driving mechanism is configured to drive the first sub-mold shell or the second sub-mold shell to rotate;

or, the driving mechanism is configured to drive the first sub-mold shell or the second sub-mold shell to move;

the driving mechanism satisfies one of the following:

the driving mechanism includes:

a main rotating shaft, the main rotating shaft being connected with the first sub-mold shell or the second sub-mold shell; and a motor, the motor being connected with the main rotating shaft, so as to drive the first sub-mold shell or the second sub-mold shell to rotate in a predetermined direction;

or, the driving mechanism includes:

a motor;

a first gear set, the first gear set being drivingly connected with the motor;

a main rotating shaft, the main rotating shaft being connected with the first gear set, so as to drive the main rotating shaft to rotate through the first gear set;

a first rack, the first rack being drivingly connected with the first gear set, the first rack being connected with the first sub-mold shell or the second sub-mold shell; and a slide rod, the slide rod being inserted through the first sub-mold shell or the second sub-mold shell, so that the first sub-mold shell or the second sub-mold shell moves along the slide rod.

* * * * *